(12) United States Patent
Callaghan

(10) Patent No.: US 11,019,048 B2
(45) Date of Patent: *May 25, 2021

(54) PASSWORD STATE MACHINE FOR ACCESSING PROTECTED RESOURCES

(71) Applicant: Microsoft Technology Licensing, LLC, Redmond, WA (US)

(72) Inventor: David Michael Callaghan, Duvall, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/709,959

(22) Filed: Dec. 11, 2019

(65) Prior Publication Data
US 2020/0120079 A1 Apr. 16, 2020

Related U.S. Application Data

(63) Continuation of application No. 15/477,977, filed on Apr. 3, 2017, now Pat. No. 10,523,648.

(51) Int. Cl.
*H04L 29/06* (2006.01)
*G06F 21/31* (2013.01)
(Continued)

(52) U.S. Cl.
CPC .............. *H04L 63/08* (2013.01); *G06F 21/31* (2013.01); *H04L 9/3226* (2013.01); *H04L 63/06* (2013.01);
(Continued)

(58) Field of Classification Search
None
See application file for complete search history.

(56) References Cited

U.S. PATENT DOCUMENTS 7,552,467 B2 * 6/2009 Lindsay ................ G06F 21/31
726/5
8,041,954 B2 ‡ 10/2011 Plesman ............... H04L 9/3228
713/18

(Continued)

OTHER PUBLICATIONS

Majzoobi, Mehrdad et al. Slender PUF Protocol: A Lightweight, Robust, and Secure Authentication by Substring Matching. 2012 IEEE Symposium on Security and Privacy Workshops. https://ieeexplore.ieee.org/stamp/stamp.jsp?tp=&arnumber=6227682 (Year: 2012).*

(Continued)

*Primary Examiner* — Jeremiah L Avery
(74) *Attorney, Agent, or Firm* — Mayer & Williams PC; Karin Williams

(57) ABSTRACT

A user authentication technique that allows a user to access a protected resource such as an account on a web site or secure files on a computing device such as a smartphone, personal computer, tablet computer, and the like, employs a shared secret that employs a state machine to sequentially transition between a series of states during which the user is requested to enter predefined information that is also a part of the shared secret. That is, the shared secret includes user-specific data that must be provided and the particular sequence or manner in which the user-specific data or credentials are to be provided. The authentication technique may supplement the user of conventional one or two factor authentication techniques requiring, e.g., a password or both a username and password, which are commonly used to gain access to a resource.

20 Claims, 9 Drawing Sheets

(51) Int. Cl.
*H04L 9/32* (2006.01)
*G06F 21/40* (2013.01)

(52) U.S. Cl.
CPC ............ *H04L 63/083* (2013.01); *H04L 63/10* (2013.01); *G06F 21/40* (2013.01); *H04L 2463/082* (2013.01)

(56) References Cited

U.S. PATENT DOCUMENTS

| | | | | |
|---|---|---|---|---|
| 8,418,238 | B2* | 4/2013 | Platt | H04L 63/20 726/8 |
| 8,468,598 | B2‡ | 6/2013 | Hebert | G06F 21/554 713/18 |
| 8,631,474 | B2‡ | 1/2014 | Brown | G06F 21/10 713/160 |
| 8,873,814 | B2‡ | 10/2014 | Goel | G06F 21/32 382/10 |
| 9,015,810 | B2‡ | 4/2015 | Parekh | G06F 21/40 726/4 |
| 9,172,697 | B1‡ | 10/2015 | Holtz | H04L 63/083 |
| 9,177,125 | B2‡ | 11/2015 | Steeves | H04L 67/306 |
| 9,213,812 | B1 | 12/2015 | Windell et al. | |
| 9,239,917 | B2‡ | 1/2016 | Kapinos | G06F 21/31 |
| 9,436,820 | B1‡ | 9/2016 | Gleichauf | G06F 21/50 |
| 9,471,767 | B2‡ | 10/2016 | Akula | G06F 21/36 |
| 10,069,914 | B1‡ | 9/2018 | Smith | H04L 67/1097 |
| 2002/0184538 | A1‡ | 12/2002 | Sugimura | G06F 21/32 726/5 |
| 2005/0273624 | A1‡ | 12/2005 | Serpa | G06F 21/31 713/18 |
| 2007/0031009 | A1‡ | 2/2007 | Mwale | G06F 21/32 382/11 |
| 2007/0185814 | A1‡ | 8/2007 | Boccon-Gibod | G06F 21/10 705/51 |
| 2007/0277224 | A1‡ | 11/2007 | Osborn | G06F 21/36 726/2 |
| 2008/0256616 | A1‡ | 10/2008 | Guarraci | H04L 63/08 726/9 |
| 2010/0115583 | A1* | 5/2010 | Delia | H04L 9/3226 726/2 |
| 2012/0066744 | A1* | 3/2012 | Knox | G06F 21/36 726/4 |
| 2012/0167162 | A1‡ | 6/2012 | Raleigh | G06F 21/57 726/1 |
| 2013/0347073 | A1‡ | 12/2013 | Bryksa | H04L 63/105 726/4 |
| 2014/0208394 | A1* | 7/2014 | Goodwin | H04L 63/08 726/4 |
| 2014/0289833 | A1* | 9/2014 | Briceno | H04L 63/08 726/7 |
| 2014/0366114 | A1‡ | 12/2014 | Wang | G06F 21/31 726/7 |
| 2015/0193608 | A1* | 7/2015 | Limberg | H04L 63/083 726/7 |
| 2015/0341335 | A1‡ | 11/2015 | Camenisch | H04L 9/3226 713/156 |
| 2016/0050209 | A1‡ | 2/2016 | Govande | H04L 63/101 726/7 |
| 2017/0093862 | A1* | 3/2017 | DeLuca | G06F 21/36 |
| 2017/0257363 | A1* | 9/2017 | Franke | H04L 63/18 |
| 2018/0337782 | A1* | 11/2018 | Wu | H04L 9/14 |

OTHER PUBLICATIONS

Yang, Jing et al. A physical-layer authentication scheme based on hash method. 2015 IEEE/CIC International Conference on Communications in China—Workshops (CIC/ICCC). https://ieeexplore.ieee.org/stamp/stamp.jsp?tp=&arnumber=7961588 (Year: 2015).*

"Simon XT Installation Manual", Interlogix, UTC Fire & Security Americas Corporation, Inc., P/N 466-2265 • REV G • Oct. 2012 (74 pages total).‡

"Configure an Authentication Profile and Sequence", https://www.paloaltonetworks.com/documentation/70/pan-os/pan-os/authentication/configure-an-authentication-profile-and-sequence, Retrieved on: Dec. 21, 2016, (9 pages total).‡

"International Search Report and Written Opinion Issued in PCT Application No. PCT/US18/024234", dated May 24, 2018, 13 Pages.‡

Peyrott, Sebastian, "What is and how does 9 Single Sign on Authentication work?", Retrieved From: https:jjauthO.comjblogjwhat-is-and-how-does-single-sign-on-work/, May 15, 2018, 11 Pages.‡

Gokhale, et al., "The Shoulder Surfing Resistant Graphical Password Authentication Technique", Published in: Procedia Computer Science, Elsevier, vol. 79, Apr. 9, 2016, 9 Pages.‡

"Halfbakery: Backspaces Password", Rerieved From: https:jjweb.archive.orgjweb/201610190 2357/http://www.halfbakery.com/ideajBackspaces 20in 20Passwords, May 14, 2018, 8 Pages.‡

Ren, Xuguang; Wu, Xin-Wen. A Novel Dynamic User Authentication Scheme. 2012 International Symposium on Communications and Information Technologies (ISCIT). https://ieeexplore.ieee.org/stamp/stamp.jsp?tp=&arnumber=6380995 (Year: 2012).‡

Schweitzer, Dino et al. Visualizing Keyboard Pattern Passwords. 2009 6th International Workshop on Visualization for Cyber Security. https://ieeexplore.ieee.org/stamp/stamp.jsp?tp=&arnumber=5375544 (Year: 2009).‡

Umadevi, P. Saranya, V. Stronger Authentication for Password using Virtual Password and Secret Little Functions. International Conference on Information Communication and Embedded Systems (ICICES2014). https://ieeexplore.ieee.org/stamp/stamp.jsp?tp=&arnumber=7033936 (Year: 2014).‡

"Office Action Issued in European Patent Application No. 18718265.4", dated Jan. 12, 2021, 8 Pages.

* cited by examiner
‡ imported from a related application

PASSWORD STATE MACHINE FOR ACCESSING PROTECTED RESOURCES

STATEMENT OF RELATED APPLICATION

This application is a continuation of U.S. Ser. No. 15/477,977, filed Apr. 3, 2017, entitled, "PASSWORD STATE MACHINE FOR ACCESSING PROTECTED RESOURCES", which is incorporated herein by reference in its entirety.

BACKGROUND

Various authentication mechanisms such as usernames and passwords are often used to control access to various kinds of computing resources and processes. A person who wishes to gain access to a resource or process may be asked to enter a username and password. If the person enters the correct username and password, then access may be granted. Otherwise, access may be withheld. Access to computing resource scenarios such as e-mail accounts, online shopping accounts, online bank accounts, accessing school records, corporate portals, virtual private networking, authenticated machine to machine communications (M2M), logging into social networking services, etc., are some examples of web or cloud-based resources and services to which access may be password-controlled. Usernames and passwords may also be required to unlock a user device such as a personal computer, mobile phone or to access functions and resources that are locally available on the user's computing device. Usernames and password are one example of a type of shared secret between two endpoints. Other examples of shared secrets are numerical PIN codes without requiring a username, and biometric information such as fingerprint or retina scanners. In each of these scenarios a credential must be presented and verified before access to the desired resource is granted.

An issue that arises in the use of passwords and the like is that they are subject to certain types of attacks. A malicious actor may gain access to protected resources if the username and password are compromised or stolen. The basis on which a password provides security is the assumption that only the legitimate user of the password knows the password. If this assumption is not true, then the password no longer provides the intended security. If a malicious actor learns the password and then presents it to the authentication manager that controls access to a resource, then the malicious actor can gain the same access as the legitimate user. Computing systems try to provide numerous layers of safeguards against malicious actors gaining access to a user's account, however if the malicious actor presents valid usernames and password credentials, it may be nearly impossible to detect the intrusion without the layers of safeguards placing an undue burden on valid users accesses to try and detect the malicious actors.

SUMMARY

A user authentication technique that allows a user to access a protected resource such as an account on a web site or secure files on a computing device such as a smartphone, personal computer, tablet computer, and the like, employs a shared secret that uses a state machine to sequentially transition between a series of states during which the user is required to enter predefined information that is also a part of the shared secret. That is, the shared secret includes both user-specific data that must be provided as well as the particular sequence or manner in which the user-specific data or credentials are to be provided. The state machine may require user specific data or nonspecific types of data or events. The state machine input expectations are a shared secret between the user and the computing device into which they are authenticating. The user interface of the device performing a state machine may be designed to give no indication during log in that a state machine is being performed as part of the authentication backend which is different than the typical two factor authentication systems which clearly ask the user to input an additional authentication step or answer a phone call and provide information. The user in some instances can select and customize the state machine to be used with their account(s) which enables them to add additional layers of security beyond the typical fingerprint, PIN or username and password complexity and rules typically established by a security policy or capability of a computing device or service envisioned by the website administrator, computer administrator or implemented by the authentication module's software developers. The state machine configuration may even include steps to be performed within a prescribed time after the username and password authentication.

The following examples of inputs that may be provided to the state machine are presented not as limitations to the subject matter described herein but to assist in the understanding of some of the myriad of possible types of inputs a user could provide to advance the state machine. These inputs can include but are not limited to inputs such as: entering the password characters with a time delay or including backspaces to fix intentional typos; sending or receiving an email; disabling/enabling WiFi before entering the password; adjusting the volume; entering an invalid password attempt two times that is an anagram of a specific secret keyword before entering the correct password, which when correctly performed at the predetermined time will progress the state machine, while failure to perform the next prescribed state would block access and assist in the detection of malicious actors trying to access the account when they provide valid usernames and passwords or other valid access credentials yet fail to successfully perform the required state machine operations to gain access.

In some embodiments this authentication technique may supplement the use of conventional one or two factor authentication techniques requiring, e.g., a password or both a username and password, which are commonly used to provide additional layers of safeguards before access is granted to a resource. In this way, even if a malicious actor were to gain access to the username and password and the two-factor authentication PIN code, the actor may not know the sequence of steps that are required to walk the state machine to a successful state that grants access. Rather than solely relying on overtly complex passwords that can still be stolen, the state machine adds additional user customizable safeguards that can be easily remembered and performed by a user, remain undetectable to certain levels of sophisticated malicious attackers. The use of the state machine, in addition to the use of a username and password, can greatly increase the level of difficulty of a brute force attack against the user's username and password since multiple states can be easily added to the login sequence. Intrusion detection can be trained to detect instances of access attempts that include a correct username and password, but yet with incorrect inputs to the state machine, which indicates a potential risk of stolen credentials. Depending on the complexity of the user's username and password the account may be suspended to protect the system from further brute force attacks until the user's identity trying to access the account can be verified by other means such as an interview with a customer service specialist trained in fraud detection. Conversely, the user account may allow more attempts to log in before suspending the account if the password was wrong or even slightly wrong if, however, the state machine requirements was properly met and were of sufficient complexity to compensate for, say, a typo in the username or password.

The user authentication techniques described herein when operating on a computing device may enhance the conventional use of credentials such as a username and password by adding another layer of complexity to the access control process for the purpose of reducing the risk that a stolen username and password can be used to access the resources, thereby improving the level of security protecting the resources of the computing device(s). Moreover, the shared secret of the state machine may be stored as executable code in a separate location from the credentials, further reducing the likelihood of a malicious actor gaining access to the entire set of authentication steps that must be performed to get access to the protected resources. The attacker would need the username and password as well as identify, access, and reverse engineer the code performing the state machine to understand what is required to follow the state machine interactions and gain access to the resources. This additional complexity significantly increases the cost and effort required to attack an enterprise system containing potentially millions of software modules obfuscating the user's specific state machine pattern as well as increasing the likelihood of intrusion detection over accounts protected by simple username and password only based access control. Lastly, a system employing the state machine can help detect compromised username and passwords, whereas in conventional systems such compromised user accounts could be accessed by the attackers without detection.

Aspects of the subject matter described herein improves upon cumbersome conventional two factor authentication systems, which require the user to receive a text message with a PIN code and mentally copy/paste the code or carry a dedicated device that has a changing numerical value to be entered as part of the challenge response validation. The use of a state machine which in some embodiments can be configured to use easily remembered inputs and acts that may be individualized by users and therefore may be more easily performed. The use of a state machine, however, does not preclude the incorporation of existing two factor solutions, but instead extends them to a more complex and secure state machine that can be individualized by each user and which can even be changed or allowed to evolve automatically in a user specified and predetermined manner.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DETAILED DESCRIPTION

Figure 1:
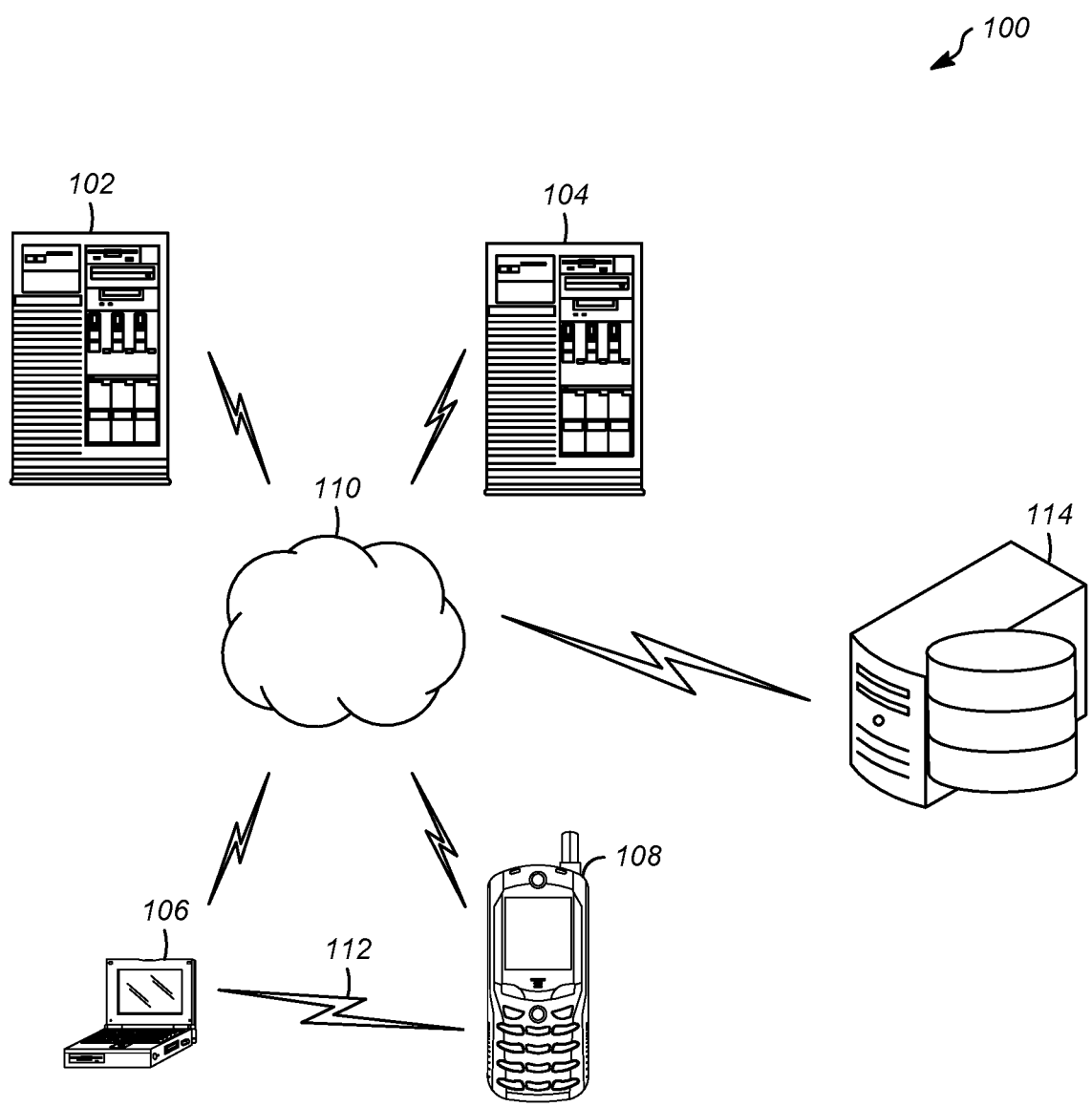
FIG. 1 is an illustration of an example environment in which aspects of the subject matter disclosed herein may be implemented.

FIG. 1 is an illustration of an environment 100 of an example embodiment in which aspects of the subject matter disclosed herein may be implemented. The environment 100 is only one example of a suitable computing environment and is not intended to suggest any limitation as to the scope of use or functionality of the disclosed subject matter. The invention is operational with numerous general purpose or special purpose computing systems or configurations. Examples of well-known computing systems, environments, and/or configurations that may be suitable for use with the invention include, but are not limited to, personal computers, server computers, hand-held or laptop devices, computing tablets, mobile communication devices (e.g., wireless cellular phone, satellite phone, wearable computing devices such as smartwatches), multiprocessor systems, microprocessor-based systems, set top boxes, programmable consumer electronics, network PCs, minicomputers, mainframe computers, embedded systems (e.g., automotive devices, medical devices, industrial devices, automation devices, internet of things (IOT) devices, computerized appliances, entertainment devices (computerized toys, game consoles, infotainment devices, smart televisions etc.), virtualized computer systems, cloud hosted computing (e.g. software as a service (SaaS), platform as a service (PaaS), infrastructure as a service (IaaS)), service oriented architectures (SOA), distributed computing environments that include any of the above systems or devices, and the like.

Environment 100 includes a first computing device 102, a second computing device 104, a third computing device 106, and a fourth computing device 108. The computing devices are connected via a communication network 110. Computing devices 102-108 in various embodiments, may be implemented using any number or combination of the aforementioned types of computing devices.

The communication network 110 may be implemented as a single network or a combination of multiple networks to enable communication between any two or more of the computing devices, such as the Internet and/or one or more intranets, a local-area network, a wide-area network, a landline or wireless network, mesh network, Ethernet, a USB hub, or any combination thereof. Computing device 106 and computing device 108 are also illustrated as being connected to each other via a communication link 112. Communication link 112 can include a direct USB connection, Apple's Lightning, a Wi-Fi or Bluetooth connection Zigbee, nearfield communication, infrared beams and/or receivers, by scanning images with encoded information (e.g. barcodes, QR Barcodes, etc), WEMO, X10, or some other communication link including wired and/or wireless connection(s). The communication links 110 and/or 112 may also be implemented by one or more of the computing devices writing data to storage device such as battery backed RAM card, compact disks, phase change memory device or FLASH based storage device (e.g. Secure Digital (SD) cards, USB Flash Drive, disk drive) or spinning media disk drives that are subsequently inserted at a destination computing device and read by the endpoint to accomplish the act of transportation of information without relying only on network infrastructure like wired or wireless signals to communicatively couple the computing devices (e.g. Sneakernet). Computing devices 102-108 may access network or cloud-based resources over communication network 110 as represented, for example, by network resource 114.

Figure 2:
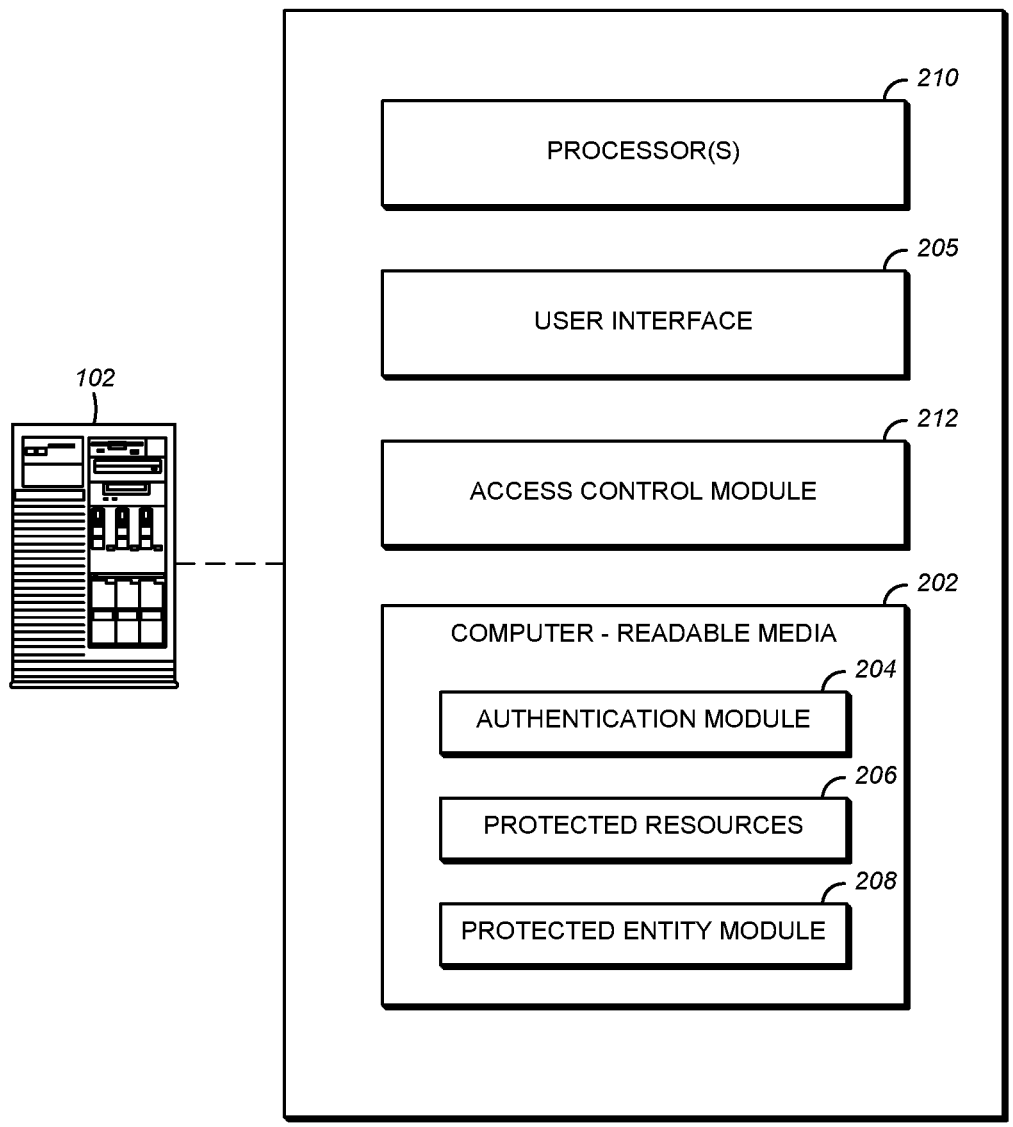
FIG. 2 shows a more detailed example of one of the computing devices shown in FIG. 1.

FIG. 2 shows a more detailed example of one of the computing devices 102-108. In this example computing device 102 includes one or more processors 210, user interface 205, and computer-readable media 202, which may include various types of storage devices (e.g., magnetic, optical, etc). as well as memory. Computer-readable media 202 contains or has access to an authentication module 204, protected resources 206, and protected entity module 208. The authentication module 204 is capable of receiving authentication requests from users via the user interface 205 and responding to the authentication requests by granting or denying access to protected resources or protected entities based on information provided in the authentication request. For example, the authentication module could grant access by creating or modifying an access control list (ACL) which is examined by the operating system before it allows the authentication requestor or a surrogate thread or process acting on behalf of the requestor to access the protected resource(s). The authentication module could also grant access by providing the requestor a secure token, cookie, digital certificate that will be subsequently used to access the resource during the connected session and/or future sessions. It should be appreciated that the subject invention could be incorporated into other authentication protocols to supplement the simple username and password credentials in scenarios such as Kerberos username/password validation step can be supplemented with additional authentication state machine steps, or Microsoft's Manage Service Accounts (MSA) username and password credentials could be extended to include performing the authentication state machine.

Protected resources 206 may include, by way of example, functions provided by computing device 102, applications hosted by computing device 102, and/or data or files stored on or accessible to computing device 102. Protected entity module 208 can be contained in or separate from computer-readable media 202 and may be hosted, for example by any of the components of the computing devices 102-114 and can be used for e.g., granting permission to information in data in memory that can be random access or sequential access, paged or non-paged memory, non-persistent memory (e.g DRAM, SRAM) or non volatile persistent memory (e.g. memristor based, phase change memory), or to permit network access to flow information or invoke functionality between applications hosted on the computing devices such as through a messaging middleware layer, proxy server, firewall or allowing access to virtual private network (VPN) resources etc. A protected entity in a home automation system might include one or more of the following: a lamp, thermostat, or alarm system. The protected entity module access can include authenticated machine to machine (e.g. web services, service oriented architecture (SOA), M2M, database accesses, messaging layers, middleware, executing stored procedures, workflow engines etc.) communications. Protected entities are not necessarily embodied on a computer-readable medium, though access to control them in the form of protected entity module 208 most likely will be.

In one implementation, user interface 205 comprises a software program, such as a graphical user interface (GUI), executable by processor 210 on computing device 102, which is specifically configured to interface and communicate with network resource 114 via network 110. In another implementation, user interface 205 comprises a browser module executing on computing device 106 that provides a network interface to browse information available over network 110. For example, user interface 205 may be implemented, in part, as a web browser to view information available over network 110. User interface 205 may be implemented, in part, as the authentication of an application executed on mobile device 108 before granting access to information available on local storage 206 or accessing services available over network 110 or a combination of both.

Computing device 102, in various embodiments, may include an access control module 212. Access control module 212 may be a part of the operating system, a separate application, or a component of another application. Access control module 212 may require being called by the operating system before granting a user access to a particular application and/or functionality of the computing device 102. Access control module 212 may operate in cooperation with the authentication module 204 to determine if the user is entitled to be granted access to any particular application and/or functionality of the computing device 102.

Figure 3:
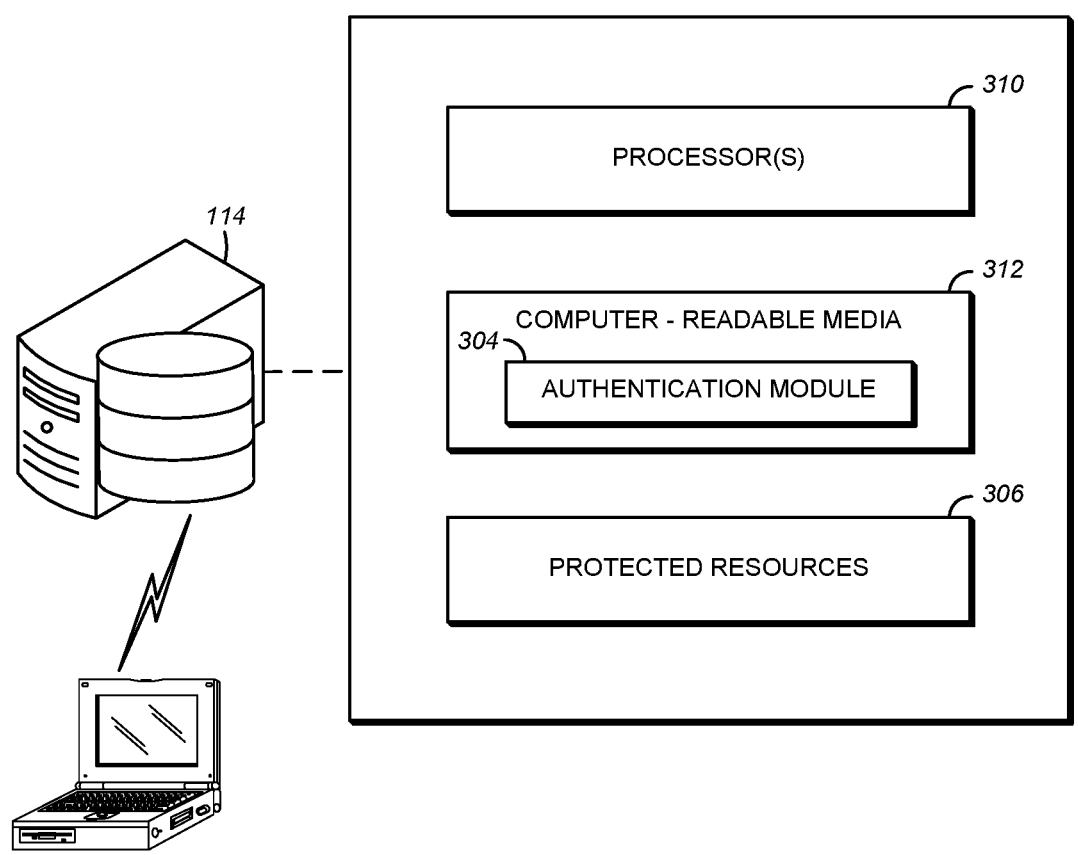
FIG. 3 shows a more detailed example of the network resource shown in FIG. 1.

FIG. 3 shows a more detailed example of one of the network resources such as network resource 114 that can deliver cloud-based services to computing devices. In one implementation network resource 114 may be a web server that hosts a web site that can be accessed by a web browser on a computing device such as computing device 106. In some cases network resource 114 may be a series of distributed servers that together host the web site accessed by the web browser. In this example network resource 114 includes one or more processors 310 and computer-readable media 312. Computer-readable media 312 contains or has access to an authentication module 304 and protected resources 306. The authentication module 304 is capable of receiving authentication requests from users of a computing device (e.g., computing devices 106 or 108) via a user interface such as a web browser over network 110. The authentication module 304 responds to the authentication requests by granting or denying access to protected resources 306 based on information provided in the authentication request. Protected resources 306 may include, by way of example, services, user-specific account data, and the like. In some embodiments authentication module 304 may be a dedicated server that is separate from the server(s) on which the protected resources are located. It should be appreciated that the subject matter described herein is not limited to single instances of servers as shown by component 114, but instead may include Cloud based computing systems as mentioned earlier such as SaaS (e.g. SAP Business ByDesign, Enterprise Resource Planning (ERP), Netflix, Gmail, Hotmail, Salesforce), PaaS (Windows Azure Cloud Services, Google App Engine, Amazon AWS), and IaaS (e.g. OpenStack), and SOA etc, which are typically hosted by such vendors' cloud compute offerings as Microsoft's Azure, Amazon's AWS, Google's Cloud Compute Platform, SAP's Cloud Platform, IBM's Watson, Oracle's Cloud, Salesforce Service Cloud, Rackspace Cloud, Facebook's Cloud, etc using proprietary cloud computing software and/or open source such as OpenStack.

In other implementations network resource 114 may be part of a hosted application providing a cloud based service consisting of applications such as databases like Microsoft's SQL, IBM DB2, middleware like IBM Websphere, and/or enterprise applications from SAP, Microsoft Dynamics. The network resource 114 may be virtualized by a cloud provider such as Microsoft's Azure, Amazon Web Service (AWS), IBM Cloud, or Google Cloud Platform (including the other aforementioned Cloud providers). Network resource 114 receives the access requests from other devices computing devices similar to computing devices 102 thru 114 over the networks 110 or 112. In this example network resource 114 may include one or more processors 310 and computer-readable media 312. Computer-readable media 312 contains or has access to an authentication module 304 and protected resources 306. The authentication module 304 is capable of receiving authentication requests that originated from one of the local or cloud based applications or services. The authentication module 304 responds to the authentication requests by granting or denying access to protected resources 306 based on information provided in the authentication request. Protected resources 306 may include, by way of example, services, user-specific account data, enterprise data, application data and the like. In some embodiments authentication module 304 may be virtualized and partitioned separately from the server(s) on which the protected resources are located.

As previously mentioned, passwords and the like have long been used to control access to resources. However, passwords are subject to being stolen when, for example, a hacker uses a key logger to identify a username and password or when the hacker gains unauthorized access to a database of usernames and passwords, or captures network traffic containing the encrypted information and breaks the encryption to reveal the secret credentials. The subject matter described herein, in some embodiments, provides a way to authenticate a user using a process through which the user must proceed in order to gain access to the resource. In some embodiments this process may not be located in the same database which stores usernames and passwords and therefore, even if a malicious entity were to gain access to the database, the entity would still not have enough information to gain access to the protected resource. Rather, the malicious entity would need to reverse engineer the additional process that is required by the authentication mechanism, increasing the complexity and the amount of time needed to complete the task and thereby provide more time during which the attack can be discovered, and remedial measures taken.

It should be appreciated that the subject matter described herein is not solely limited to situations in which a human user logs into a computer system. Rather, in some embodiments this process can be performed by a computer software application or service for scenarios involving machine to machine authentication and secure interoperability as well as for authenticating services that run on a computing device. The subject matter can be integrated as an enhancement to virtually any existing username and password based scenario to provide additional security protections. For example the authentication module that is enhanced with state machine steps could improve the security of Microsoft's Managed Service Accounts (MSAs). MSAs are accounts created in an Active Directory tied to a specific computer. The account has its own complex password and is maintained automatically. The subject matter described herein can add the additional authentication process to the validation of the MSA to include a user and password along with the enhanced validation process identifier or optional validation inputs or events that would be performed when the MSA authentication steps occur.

Another example of a password based system that could be extended to incorporate the use of a password and state machine information to perform verification of the user or machine account requesting access to the resource 306 is the Kerberos protocol. (The Kerberos Network Authentication specification is available from numerous sources such as https://web.mit.edu/kerberos/ (incorporated by reference) and high level descriptions of the system are available from http://www.roguelynn.com/words/explain-like-im-5-kerberos (incorporated by reference).) For example, extending the description available at the URL http://www.roguelynn.com/words/explain-like-im-5-kerberos, the user may make a request to the Authentication Server with an ID, name of the requested service (Ticket Granting Server), network address, and requested lifetime for the validity of the ticket granting ticket. It may add to the username the user's preferred state machine to be incorporated into the request or it may be configured as a shared secret in the Authentication Server Key Distribution Center (KDC) database.

The Authentication Server will return two messages, one of which is encrypted with the Client's Secret Key containing TGS Name/ID, timestamp, lifetime, and TGS Session Key. A state machine as described herein may be employed, for example, by the Authentication Server returning a Session Key containing a value or timestamp known to be changed by the Client when it is reused in subsequent messages. A computer hacker not aware of the exact offset to be compensated to the key will inadvertently perform the standard Kerberos protocol and return a nominal value and reveal they are not aware of how to perform the shared secret regarding the time parameter inclusion in the authentication state machine when implementing the Kerberos authentication protocol. In addition, when the Client machine applies a user password and salt to decrypt the second message in order to obtain the TGS session Key. The user may be required to perform a state machine on the client and enter an incorrect password containing a hash of the timestamp and then the correct password. An attacker would not know specifically why entering a compromised user password correctly did not successfully decrypt the TGS Session Key, and could be used as a system event indicating the user's account may have been compromised. Of course, the use of a state machine as described herein is not limited to only extending the Kerberos protocol in this manner, which is simply presented as one example to show how the concept of a state machine with a shared secret known to the system administrator and the user can be used to supplement the authentication protocol and enhance detectability of access attempts by rogue users or software services.

Figure 4:
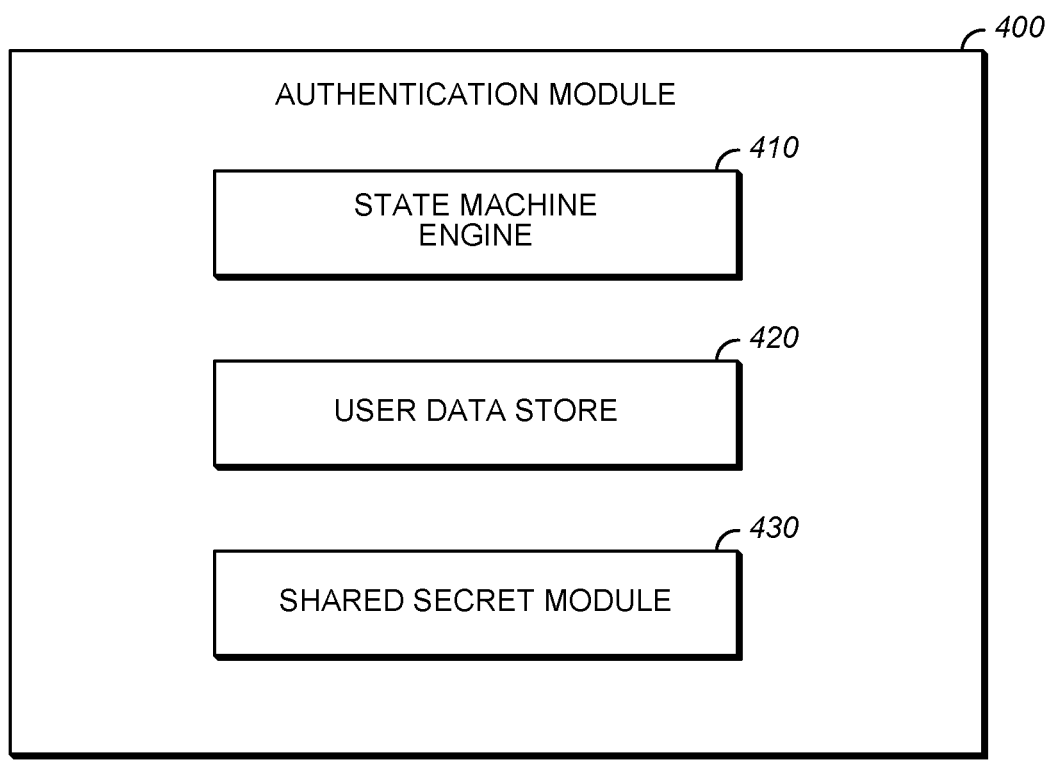
FIG. 4 shows one example of an authentication module such as the ones shown in FIGS. 2 and 3.

FIG. 4 shows one example of an authentication module 400 such as authentication modules 204 and 304 shown in FIGS. 2 and 3, which may be used by any entity such as the aforementioned computing devices or network resources to control access to a protected resource. Authentication module 400 includes state machine engine 410, user data store 420 and shared secret module 430.

State machine engine 410 represents a computational component that models the behavior in terms of a set of states and a set of transitions. A transition is a change from one state to another that is triggered in response to an external input. The state machine engine 410 can only be in one state at a time. In the present case the external input that triggers a state change may be expressed in terms of an action (or inaction such as a predefined delay) that is to be performed by a user who is to be authenticated in order to gain access to a requested resource. The state machine engine 410 performs a computational process that can be defined by a list of its states, its initial state, and the conditions (e.g., user actions or events) for each transition. The shared secret module 430 stores, for each user to be allowed access to a protected resource, the user specific states through which the state machine engine 410 must transition and the user-specific inputs that are required to transition between those states. For convenience, the sequence of two or more states and the required inputs will from time to time be referred to below as the state machine pattern, constituting the shared secret used to access a resource. In some embodiments the state machine pattern may be in the form of compiled software code that is to be executed by the state machine engine 410. In this way, even if an unauthorized attacker were to obtain the code, it would still be necessary for it to be decompiled in order for the attacker to gain access to a protected resource. The interaction with a software module may cause the interaction with another software module in predefined ways to obfuscate tracing. For example a software module may delete itself after execution making it impossible for the attacker to reproduce the login events since a middleware module is now missing. The state machine can be used in this kind of scenario to trigger one-time access events useful when the network or computer system cannot be completely trusted. By the time an attacker captures the network traffic and cracks the hashed or encrypted messages the accessible code path is deleted by the server when the module is erased. The software module may perform different hashing algorithms than the operating systems password hashing module to make a brute force attack against the algorithms used to protect the system more complicated, or it may implement features such as a programmatic time delay that will signal to the system the password may now be accepted. If a user attempted a log in before the module timeout it could be used to trigger an intrusion and disable the account or some other logging feature that raises awareness of an increased risk associated with the account. Modules may also implement features undetectable to the average attacker such as sending what could be considered a typical spam email that the user knows to respond to with a specific keyword to trigger access in a subsequent browser log on or access attempt.

It is important to note that the application of the password state machine enhancements described herein to a system that currently uses just a username and password or PIN code provides greater protection against the system being accessed by a malicious attacker under certain scenarios. For example if the hacker were able to install a keylogger and even somehow manage to record a video of the user typing in their username and password and observes the user performing the shared secret state machine access steps, the shared secret can include a plan to limit the number of accesses using the credentials and the specific state machine inputs that are observed by the malicious attacker(s). If the limit is set to a one-time use, then the malicious attacker cannot access the system using the information they obtained, even if it was exactly what was required to access the resources just a moment ago. The state machine module can be adaptive shared secret such as each successive access attempt should use the next sibling's name in alphabetical order, which would fail the recorded replay attack with a limited set of access attempts. The adaptive state machine can be even more complex making the algorithm discovery more difficult. Related to software modules being used to implement the shared secret state machine, the system, for example, can delete a critical software state machine module necessary to perform that one time use or limited time use module when the number of tries allowed has been met. When the number of uses for a state machine access has expired the user should use another method provided to them by the system administrator or shared secret etc. The number of times a state machine can be used to access the system resources can be one time, a limited number of times, or an unlimited number of times. The user can invoke a shared secret state machine input to not only access the system but instead a shared secret state machine can be used to delete all accesses to the account, suspend or resume state machine based accesses, or even delete the account, etc. The state machine may be employed when a user elevates their account such as, for example, when logged into a system and the user wishes to transition to an administrator or root account, in which case they may need to use the credentials along with the state machine steps before the system will elevate their account status. For example, a user may create a local or remote terminal session with a system and log in using their normal username and password. The system administrator and user may or may not have configured the user to perform a state machine process as part of this log in. When the user wishes to elevate the account to gain more privileges such as a root or administrator account they may need to provide the username and password and perform the state machine steps before their account is elevated. Similarly, the user may need to perform the state machine steps along with their credentials to switch user accounts, lower privileges etc. The client machine or remote server being accessed can keep track of the accesses using a globally accessible database to limit the number of times the user credentials and state machine can be used to access the resources or specific resources etc. The state machine may be required, for instance, only during certain times of day, specific set of days, or it may have an expiration date or time instead of a number of times a user may access a system. The shared secret inputs of the state machine can also be peripheral specific something a malicious attacker might not have configured in their system like receive a network packet from a network adapter with an Ethernet MAC Address "48-0F-CF-61-E0-B1" or a specific vendor of trackpad inputs, system motherboard serial number as part of a multi-step state machine.

The user data store 420 may store additional user credentials that in some cases may be required to gain access to a protected resource. For instance, in some embodiments the user data store 420 may store for each user a username and password. User data store 420 and shared secret module 430 may be physically maintained in different locations and different secure data structures in order to reduce the likelihood of an unauthorized attacker improperly obtaining access to the protected resource.

It should be noted that in some embodiments the functionality of the authentication module 400 shown in FIG. 4 may be incorporated into one or more applications that need to access a resource so that the application can perform the authentication process described herein.

It should also be noted that the authentication mechanism described herein does not in any way limit the particular state machine patterns that may be employed (the particular sequence of states and the user actions required to transition between those states that are necessary to successfully gain access to a resource). For purposes of illustration, a few non-limiting examples will be presented below. In some embodiments the state machine pattern may be selected or customized by the individual users. Alternatively, in some cases, the user may be presented with a series of state machine patterns from which to select. In yet other cases, the state machine pattern that is to be used may be dictated by the entity that controls access to the resource being requested.

In one example of a state machine pattern, or as a portion of a larger state machine pattern, the user may be required to follow a sequence of three steps. In the first step the user may be required to correctly enter his or her password, in the second step incorrectly enter the password, and in the third step once again correctly enter the password. It should be noted that during the authentication process the user will not be prompted as to which kind of input correct or incorrect should be input to perform the state machine steps. Rather, these steps constitute the shared secret previously established by the user during an initial configuration process. Of course, the particular number of steps that are employed (e.g. the number of times the user must correctly and incorrectly enter his or her password) and the order in which they are to be performed is not limited to those presented in this example. Failure of a malicious attacker to perform these steps could be used to trigger intrusion detection. The online resource may also spoof the user's account with a fake system (commonly referred to as a honeypot) that is replaced by the user's actual account when the state machine is properly performed. Actions taken by a malicious attacker in the honeypot environment could be used to more easily identify intrusion detection.

In another example of the state machine operation a user may enter their username and password into a client machine, for example at the log in prompt when the machine is first booted up. However, the shared secret is that the input field will receive a number of backspace characters at specific locations in the user's stream of characters typed into the input field or at the console prompts. The system is tracking every user input interaction with the input field as part of the log on attempt. Thus the user knows to enter their password and include two incorrectly typed characters then add two backspaces and fix the typos to enter their valid password. It should be noted the backspaces are part of the client access input field's state machine validation. Thus, successful human access to the machine keyboard interface may require a successful match of the username and hashed password but also have a system driver that identified two backspaces in the log in attempt at the correct locations, the sum of states required to grant access to the system. A malicious attacker who observed the user enter their username without knowing that a state machine was being incorporated would simply enter the valid password they observed and unknowingly trigger an intrusion detection, despite entering the correct username and password that at the current moment could be used by a remote terminal accesses to the client computer using the same user's account information. If the user makes a mistake they can simply enter the username and password wrong one time and then try again. Or the user could know a secret key command like pressing the keyboard's control key and upper case letter "C", for instance, as part of the password input and the system could ignore everything before the control+"C" without the user having to go through an invalid log in attempt if that was not part of process used to advance the state machine. If the user enters enough delete characters to delete all their inputs that too could be used by the system to start the user input processing of user name and password with secret embedded keystrokes for user credentials along with state machine input processing.

The system is not limited to previously accepted standards of functionality for what constitutes an input character during a user name and password log in attempt. For example the user may press the scroll lock button or shift key a number of times without any other concurrent keystrokes to be counted as part of the state machine steps if required to complete the shared secret state machine without having to actually input characters into the input box. In systems without the state machine as described herein, the user simply pressing the shift key or control key (ctrl) with no other inputs would be basically ignored with regard to being considered as an input into the username or password input field unless some other key was pressed along with them. Suffice to say that the subject matter described herein may allow full use of the totality of keyboard inputs that are possible in addition to other inputs to accomplish the steps specified by the state machine. That is, the input are not limited to keyboard inputs and could include, for instance, system events, touch patterns, mouse movements, attachment and removal of a peripheral such as a keyboard or mouse etc.

Furthermore, the use of a username and password along with meta keys used to drive the state machine can be used for scenarios other than just a local log in access processes. For instance, they can be used to access remote computers using terminals such as ssh, bash, X11, VT220 terminal emulators etc. The client computer where the user inputs into the terminal could track all the inputs and send them to the server for input validation and state machine processing or there could be a hybrid system where some of the processing is done on the client machine and some on the server to evaluate the totality of inputs and state machine actions, for example, if the remote system provided the client with a plug in module to execute one time for the shared secret state machine steps to be performed or input.

In regard to tracking the backspace to remove characters from the input field and then fixing it up as part of the state machine, it should be noted that the user can use the mouse or other user input device to select valid or invalid characters input into the username, password, or PIN fields, random characters that appear on the screen or images of characters, select, delete, cut or paste using the mouse in different positions of the user input, which makes an attacker's ability to use a key logger to obtain the information entered in the username and password (or PIN) fields more difficult because they will not know the positions where the user deleted or cut and pasted the characters unless the attacker can track the mouse movements and insertion and deletion points, what was on the screen, which may also require knowing the screen resolution, position of the characters, m font sizes, etc. Thus, using the mouse to edit the input of username, password, or PIN makes it more difficult for an attacker to successfully input the user's access credentials successfully into a machine using a remote attack or other mechanism to access the user's account. It can also provide warnings of intrusion since they will unsuccessfully track the user interactions with the input fields. In some embodiments the state machine may even be configured so that the user is to click a specific region of the "OK" button or "Submit" button or "Sign In" button on the user interface, like a specific corner or side of the button, or a different side each access (etc), swipe the button vs. click etc. An attacker who does not click or interact with that specific area or method would trigger scrutiny from the intrusion detection analysis system, which, based on how far off the click (or input action) was from the specific region or expected method, and could indicate that the account has been compromised or represent an escalated risk of being compromised.

In a related scenario, the user who possesses e.g., a 5 digit PIN to access an ATM machine may have a shared secret with their bank. They may intentionally enter one of the digits (e.g., the 3rd digit) wrong and then enter two more numbers correctly, then go back and delete 3 numbers to fix the typo and entire all 5 digits correctly. The ATM state machine will look for the entire set of edits as part of the validation of the PIN where the user does not need to remember an extra long PIN, while the total number of secret keys to be entered is more than 5 and the location in the string where the correction is made and invalid number used is a shared secret. Other examples can be contemplated where this process is repeated several times before the system grants access despite the user only ever memorizing a specific 5 digit sequence. For instance, the shared secret could be that the system will accept a longer PIN from the user before accepting the actual PIN, thus enabling a two factor authentication without the system appearing to require it. Failure to enter the access state machine could be used to trigger intrusion detection systems or place alerts on an account. Lastly, once accessing an ATM machine, the user might perform a known action like pressing an alternative or combination of user interface button(s) in response to the terminal's presentation of a question such as "Do you want a receipt?" when provided with the choices "Yes" and "No" (instead of or in addition to choosing Yes or No) all of which are required to complete the state machine log in action for accessing their account from an ATM machine. Of course, the aforementioned examples are not intended to be an exhaustive list of scenarios. The configuration parameters are only limited by the creativity of kinds of shared secrets that can be captured in an extensible state machine authentication system.

In another example of a state machine pattern, or as a portion of a larger state machine pattern, the shared secret may include one or more numbers or other characters. During the authentication process the user may be sequentially presented with a series of different numbers or characters, each of which may represent a single state. As part of the state machine pattern, in order to transition from one state to another, the user may be required to select the previously specified number when it appears on a display. Thus, in this example the user is presented with a sequence of incorrect states, but must wait for the correct state to be presented in order to be authenticated. Similarly, in another example, the shared secret may include a specific question such as a question that asks the user what city he or she was born in, for instance and they would advance the state by entering it incorrectly (or a more precise incorrect answer such as any city in the state of Washington beginning with the letter D) and then follow it up with their actual information. (Note that a typical attacker might obtain the correct backup questions web sites typically ask from a person's publicly available social network profile, and that information would not be sufficient for a state machine enhanced authentication based system.) During the authentication process the user may be presented with a series of questions and the user only answers the one question that constitutes the shared secret. If the user answers any of the other questions, even correctly, access to the resource will be denied.

In another example of a state machine pattern, or as a portion of a larger state machine pattern, a user is trying to gain access to an account on a web site service provider having multiple domains such as different domains for different countries. If, for instance, a user wishes to gain entry to an account on the web site abc.co.us, he or she may be required to enter that site via one of their affiliated countries' domains such as abc.co.fr. That is, in order to transition from one state to another during the authentication process the user may be required to access the desired web site through another web site and not by directly navigating to the desired site. The server may deposit a cookie on the user's machine or notify a backend module which is incorporated in the user's subsequent log on attempt from their local/preferred domain abc.co.us. The system may be configured such that the user does not have to successfully access the remote domain but merely enter a username and a specifically incorrect password to advance the state machine to then accept the user's access from their normal desired domain. In the aforementioned example, the user attempting a log in to abc.co.fr would be sufficient to record a system event that provides the user for example a state machine opportunity to access the abc.co.us using their username and password. It could be time limited so that for the next e.g., 30 seconds, the user may attempt access abc.co.us using this one time or multiple use access.

Similarly the user may need to direct their browser to a public web site such as www.contoso.com and then refresh the browser a number of times, the server then notices the behavior from the client IP address and uses this information to proceed through the steps of a state machine that eventually accepts the user to enter their username and password into the input field. The user browser could execute a module provided by the server to receive each user input character to accomplish the effect of the user entering a set of characters into the input fields that includes characters and back spaces or other meta characters as part of the username and password input along with state machine inputs. The user may have a special character code they enter into the input box that is copied/pasted from a special email or text message from the remote system that the user modifies using a shared secret with the remote administrator. For instance, the use may add their mother's birthday to the PIN code received from the server. The state machine shared secret could include refreshing the home page 3 times and enter into a website search box on the website enter a secret such as a PIN or password. After that search is performed it may actually be tracked by the remote server which then promotes the user to actually logged in status. Any users that fail to follow a shared secret state machine could have their account suspended or their IP address blocked, depending on how sensitive the information at www.contoso.com might be. The remote access state machine secret for www.contoso.com could simply be that any machine that wants to access an IP Address will try to access a user provided secret URL such as www.contoso.com/11223344UserX and the server logs their IP address accessing that URL. Then the user accesses www.contoso.com and they are presented with a username and password field and normal access is granted if they enter their username and password correctly only because they completed the first part of the state machine access by requesting the shared secret URL before trying to access the site with their username and password. The administrator might have a policy that uses a specific URL per account or a common URL for more than one user. The secret URL may be used to reset the state machine if the user finds they have wandered off the prescribed state machine script and this shared secret could be used to indicate to the remote system they want to reset and start over. The number of resets and repeated attempts can be limited to one or a specific number of reset tries per day, per month, per user, etc., or the status of their account can be changed to suspended, deleted etc.

In another example of a state machine pattern, or as a portion of a larger state machine pattern, the shared secret may require the user to enter incorrect information in response to one or prompts. For instance, if the user is presented with a picture, the user may be required to enter the name of an object representing its opposite. For example, if the user is presented with a picture of water, the shared secret could be an answer that is opposite meaning, in such a case the user may be required to enter "fire."

In another example of a state machine pattern, or as a portion of a larger state machine pattern, the shared secret may require the user to draw a sequence of swipe patterns on a touch screen or tap a pattern on the touch screen or, if the computing device includes inertial sensors, shake the computing device in a certain manner.

In yet another example, it may be the case that not all of the state machine operations necessarily have to be completed before or at the moment the access request decision is made. The user may be granted access to a computers resources after entering the username and password, however, unknown to the attacker the system may operate in a reduced functionality mode until the user performs a shared secret action such as disabling/enabling WiFi, moving the mouse to a specific corner of the screen or tapping a region of the screen a certain number of times. If the user fails to perform these actions the system will not launch any services or features that enable an attacker to copy information to/from the system. The computer may activate the user's preferences for the device to only perform lost device online recovery services, related to finding their phone etc. In addition, the system may enter a disabled state until a users log into a remote portal and verifies their identity through extensive means. This example of the state machine behavior is an additional example of the kinds of behavior software modules integrated into the authentication layer notifications can be used to identify malicious attackers. The system may highly encrypt or delete information and restore it after the user completes the full log in state machine successfully. Further the system could log the user into a fake account or honeypot machine where they become frustrated with various emulated broken features in the system, such as frequent crashes, fake messages about system events, or intentional memory corruption and/or application errors, USB ports or drivers that are disabled as if it were a hardware error, display drivers that flicker or emulates inoperable areas of the screen or touch input, and a battery charging system that no longer actually recharges the battery. The user might also be presented with fake honeypot files that when accessed cause the system to enter a disabled state until an identity check is performed based on the current user demonstrating successful completion of a state machine challenge or responding to appropriate level of questioning useful to determine the authenticity or identity of the user.

Figure 5:
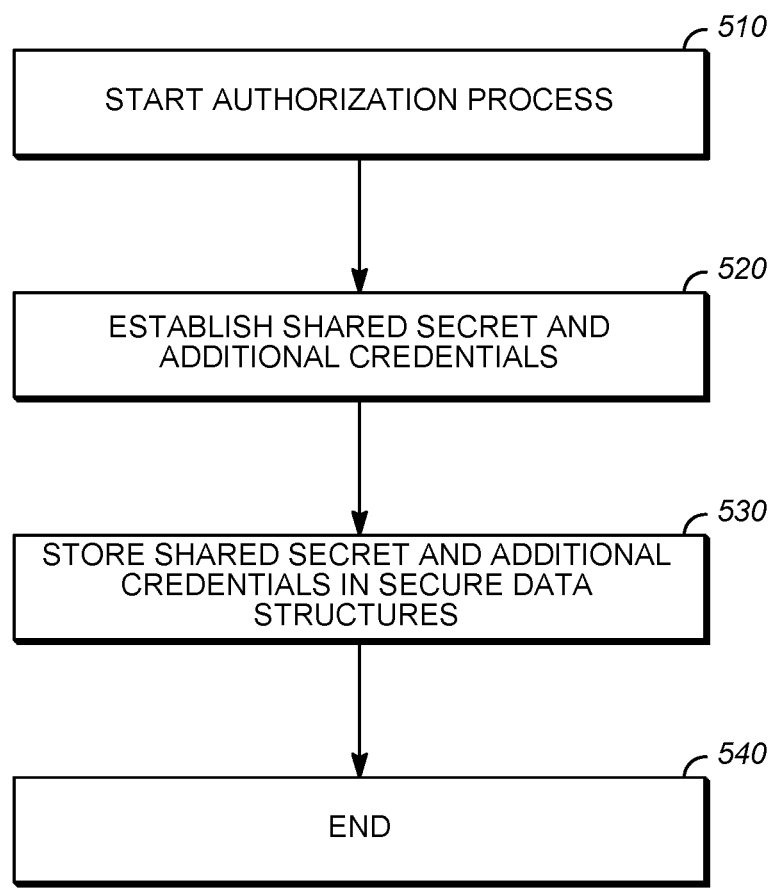
FIG. 5 is a flowchart showing one example of a process that a user may use to preconfigure an authentication mechanism.

FIG. 5 is a flowchart showing one example of a process that a user may use to preconfigure an authentication mechanism, e.g., authentication modules 204 and 304 in FIGS. 2 and 3, through a user settings/configuration menu of a computing device which may be accessed through the user interface. The user initiates the authentication or access control process at block 510. At block 520, during a registration step, the user is presented with a user settings/configuration interface through which the user may establish authentications, set access control rules as part of a log-in procedure, and/or categorize applications and functionalities to control access to either local resources and entities or network resources. For an initial configuration, the user may be guided through the creation and/or selection of valid authentications and access control rules by the user interface. In this way the user is able to set up an account that allows the user to access the desired resource(s).

As a part of the registration block 520, the user establishes a shared secret with the authentication mechanism that controls access to the desired resource. As previously mentioned, the shared secret includes a state machine pattern that is defined by a sequence of states during each of which predefined authentication information is to be provided. Non-limiting examples of such sequences and the authentication information needed to transition between them have been presented above. The registration process may also be used to establish other credentials, such as a username and password that may also be required to gain access to the desired resource.

In some embodiments, the user may be presented with a user interface where they can assemble state machine recipes consisting of various available state machine elements. For example the user may configure an email application ("app") to require two invalid username attempts before granting access, whereas a video streaming app may simply require a pattern of two valid preconfigured fingerprint scans (which will be reported as invalid by the state machine on the user interface but successfully processed internally to advance to the next access state) followed by an invalid fingerprint scan (in user uses an unconfigured finger), and lastly a valid fingerprint scan. It should be appreciated that many modern user interfaces provide graphical tools that make it easy to assemble and configure various apps with individualized or shared state machine recipes when an account (online or local) is created or modified by the user, system administrator, an information technology (IT) administrator or a remote customer support personnel assisting the user with the account maintenance.

Next, at block 530, the appropriate authentication or access control mechanism receives the shared secret and any additional credentials. The additional credentials, if employed, are stored in a first secure data structure such as a database that maintains the user credentials. For additional security, the compiled executable code module or other secret may be stored in a second separate secure data structure at block 530. In addition, an identifier or other reference to the shared secret is associated with the additional credentials and also stored in the first data structure. The identifier may be used by the access control mechanism to obtain the shared secret from the second data structure so it can be applied to the state machine. The access control mechanism then uses the identifier or other reference to obtain and execute the shared secret, which may be a compiled executable code module (e.g., binary executable, javascript, PHP, .NET, Java, Python, CGI-bin script). The shared secret state machine identifier may be stored in a database which identifies a module that performs the shared secret validation but will not be useful for an attacker to determine how to log into the system if they gain access to the username and password database, even if they can decrypt the username and passwords. In this way even if a malicious actor were to gain access to the user credentials in the first secure data structure, they would still not be able to access the protected resources since they would only have in their possession the identifier of the shared secret, not the shared secret itself. The identifier may point to nothing, an intrusion detection module, or an actual shared secret module or feature, which may also be a shared secret between the user and the system administrator. Moreover, even if they were to gain access to the shared secret, they still would not be able to easily execute the code. Part of the functionality involved with the state machine processing may be stored inside or related to a trusted platform module (TPM) which means the state machine code that interacts with the TPM cannot be copied and successfully executed on another computing device that has a different TPM configuration. For example the username and password file may point to state machine algorithm #12 on a first computer system that has a specific supporting algorithm configured to interact with the systems's TPM which keeps the details of the algorithm secret. Since that TPM algorithm has not been installed on a second computer system, then the code module performing the state machine interacting with the TPM will not function properly even if the algorithm is copied to another system.

It should be appreciated that the user may have created a custom access state machine using a visual interface or programmatic blocks. This secret state machine is then compiled into an encrypted data and/or executable script by the server or client and may include one way hashing type functionality for the state machine inputs and valid responses, and even leverage asymmetric encryption to protect the state machine code and data states. The module may be stored at the local client or on a remote machine and retrieved later on as part of implementing the access state machine when the user tries to access a specific (different module per resource) or more general case (one or more modules shared) for resource(s). The algorithm can be split and some secret sections stored in a TPM that ties the successful state machine to TPM's that have been configured to perform the secret operations or decryptions etc. After the credentials and shared secret have been successfully stored, the process terminates at block 540.

Figure 6:
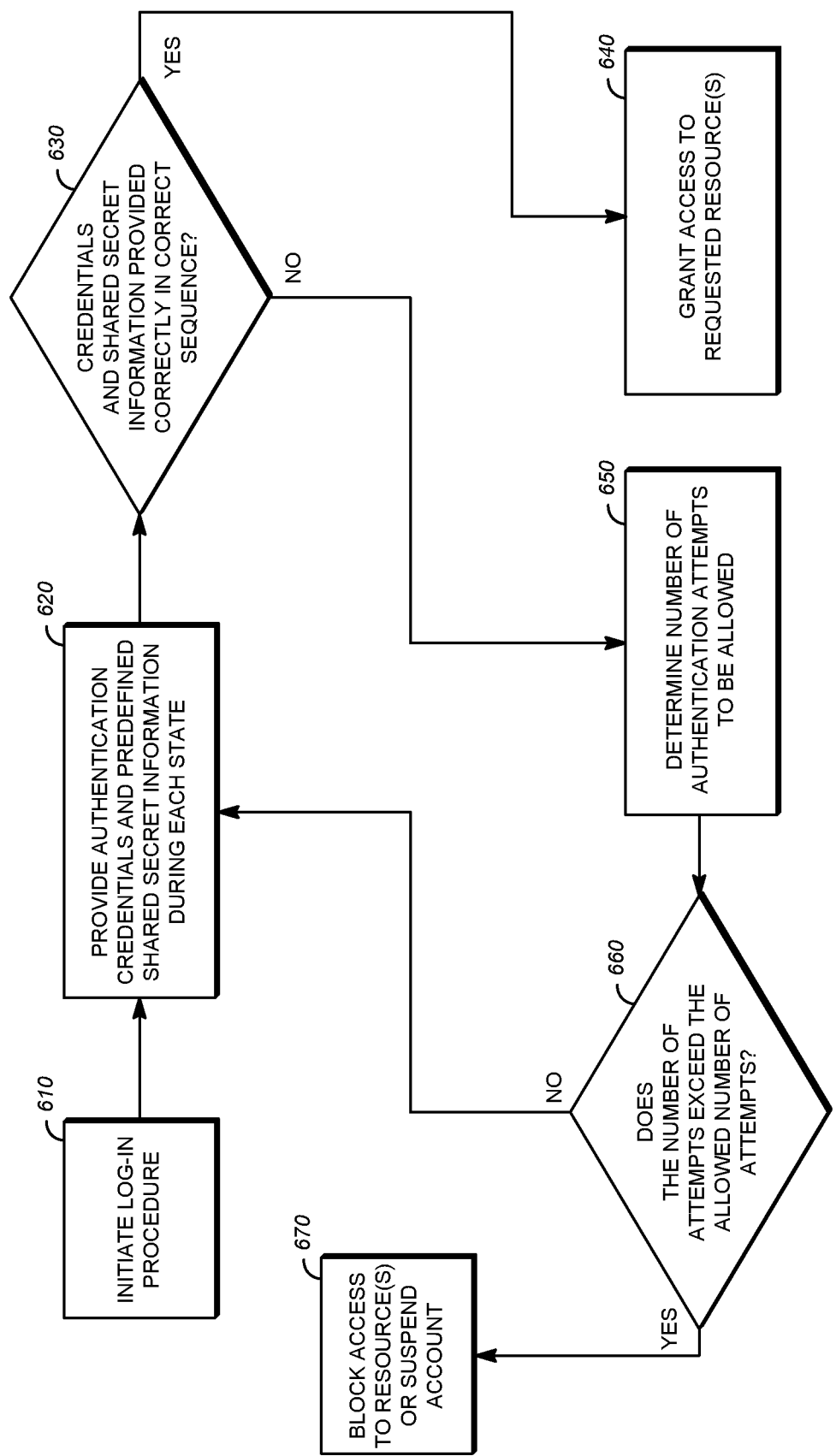
FIG. 6 shows one example of a method for providing access control to a resource.

FIG. 6 shows one example of a method for providing access control to a resource. The method begins at block 610 when the user initiates a log-in or other authentication procedure to gain access to one or more resources. (The client or remote machine at this point may already be executing the state machine or exchange data or modules to enable the state machine validation enhancements.) At block 620 the user provides any necessary credentials (e.g., username and password and additional state machine inputs such as keystrokes, events, etc) and the predefined authentication information constituting the shared secret in the sequence specified by the shared secret to advance the state machine to the desired "approve authentication" state. For example the user state machine could be programmed to expect the user to enter the username correct but enter the password incorrect two times (the invalid password in this scenario has never the user's valid password before) and then enter the correct password on the third try. The authentication mechanism then determines at block 630 if the predefined authentication information has been correctly entered in the sequence predefined in the shared secret. If so, then access is granted to the requested resource at block 640 and the process ends. If the predefined authentication information has not been correctly provided, the method may proceed to optional block 650 during which the authentication mechanism may determine the number of incorrect authentication attempts the user is allowed before either blocking access to the resource or suspending the account. The number of invalid attempts may be encoded in a software module related to the resource being accessed or configured across multiple resources by a system wide parameter enforced by the authentication system, security policy, kernel and/or operating system. As an alternative to this optional step, the authentication mechanism may simply provide the user with a default number of attempts to successfully complete the authentication process before blocking access to the resource or suspending the account.

At optional block 650 the authentication mechanism examines the complexity of one of the credentials that have been entered by the user as a supplement to the shared secret. For instance, the authentication mechanism may examine the user's password that has been entered at block 620. The more complex the credential being examined, the more attempts the user will be given to correctly complete the authentication process and conversely, the less complex the credential being examined, the fewer attempts the user will be given to correctly complete the authentication process. The complexity of the credential being examined may be determined in any of a variety of ways. For instance, in the case of an alphanumeric password, the complexity may be based in part on the number of characters in the password and the variety of letters, numbers and other symbols that constitute the password. The algorithm may allow a certain number of invalid retries as a representation of a total acceptable amount of risk. Besides retry counts, other factors that can be used to determine the complexity of the password and its relationship to previously stored passwords to influence the decision to increment the weight of an invalid access attempt risk factor towards the determination that the number of retries and scope of invalid entries has exceeded an acceptable threshold or not. For example if the user has used a password "Asdfjkl#1" and "Asdfjkl#2" in the past and the current password is "Asdfjkl#3" it could be anticipated that an attacker that has obtained an old password file might try "Asdfjkl#3" as the current password, so this password complexity may be considered low despite containing upper, lower, numerals and symbols. A slightly invalid attempt at the state machine could trigger a higher suspicion of risk if the password is correct but the state machine is invalid on fewer total retries. Whereas if the user never used a password with the "Asdfjkl#" sequence, and entered "Asdfjkl32" it might not trigger as significant risk if the next attempt is "Asdfjkl#2" because it is conceivable the user missed the shift key and the rest of the state machine was performed correctly.

Using either a default number of attempts to successfully complete the authentication process or the number determined at block 650, the authentication mechanism will determine if that number of retries (or the accumulated risk) has been exceeded at decision block 660. If so, the authentication mechanism may either block access to the resource for some period of time (e.g., 10 minutes) at block 670 before the user may be allowed to make another attempt or, alternatively, the user's account may be suspended, requiring the user to take additional steps to have it reinstated. If the number of attempts to gain access has not been exceeded the process returns to block 620, which allows the user to once again attempt to gain access to the resource. The system could even use this event to trigger the enablement of the state machine so that additional inputs are needed in addition to the standard username and password for a period of time or for future log in attempts or until the user's identity can be confirmed or the password changed etc. It should be appreciated that while not shown in FIG. 6, the user may be granted access to the requested resources 640 or a partial set of requested resources and yet still need to provide more system state machine inputs such as disabling WiFi and enabling WiFi (as mentioned earlier or the other numerous examples like tapping a specific region of the screen, shaking the device, tracing a pattern etc.) to complete the entire authentication process. The user may be placed in a honeypot login state 640 with the appearance of being granted access to the system or resources and not actually be granted full access to the actual system resources until they complete authentication steps required by software modules or other state configuration requirements. If they fail to perform the final state machine access requirements they can be logged out of the system and it may enter reduced functionality or special functionality states as mentioned earlier.

Figure 7:
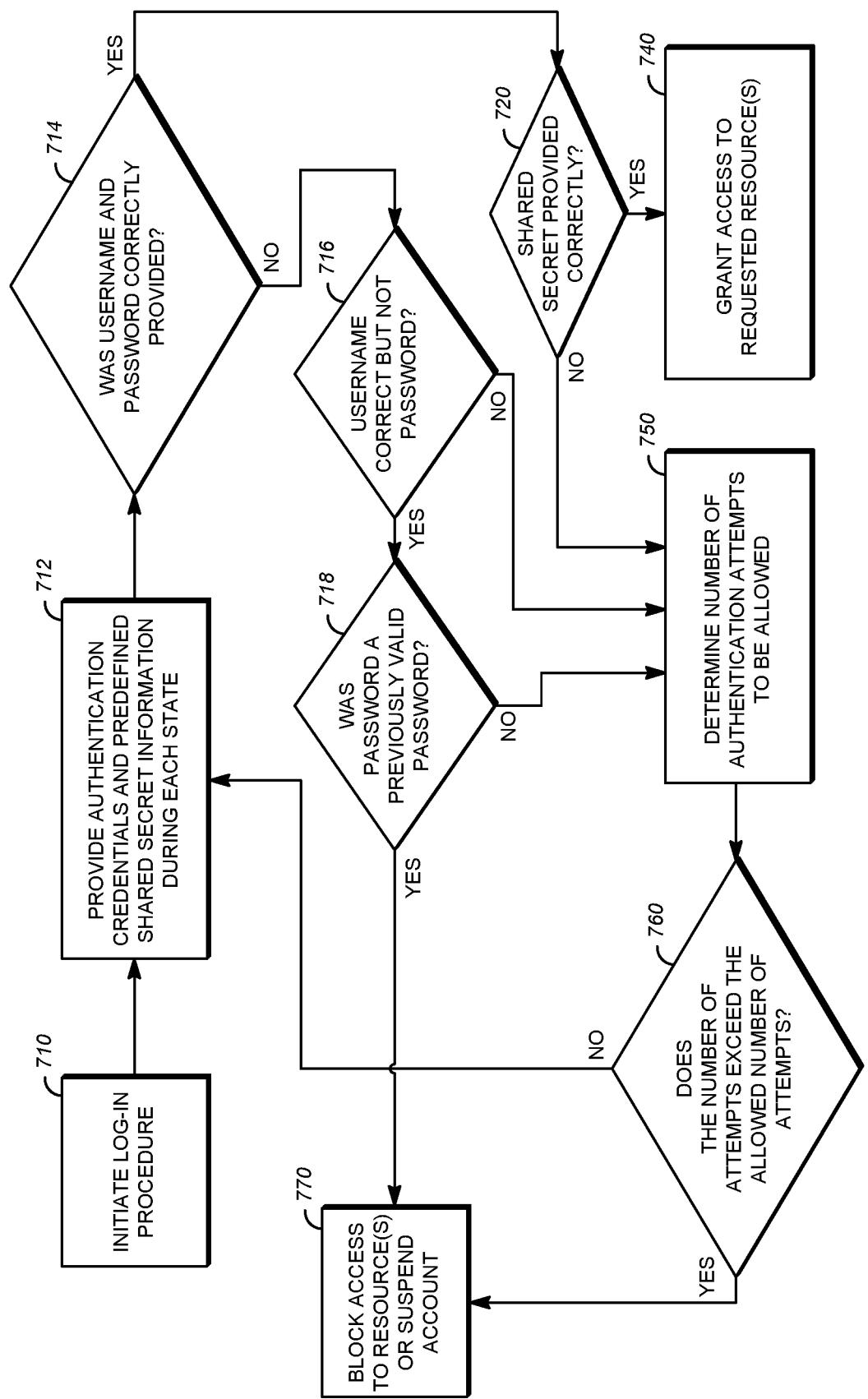
FIG. 7 shows another example of a method for providing access control to a resource.

FIG. 7 shows another example of a method for providing access control to a resource. This example is similar to the example shown in FIG. 6 except it is designed to handle the scenario when the user enters an incorrect password, which happens to be an old, previously valid password when the system was expecting two invalid password attempts (as one example). This scenario is useful to illustrate one embodiment and is not to be construed as a limitation of the subject matter described herein. In this embodiment, the state machine may be looking for inputs that do not match the expected parameters and it may have exclusions on what are acceptable valid or invalid inputs based on previously shared secrets to prevent a malicious attacker from being able to use old information to gain access to the system. The method begins at block 710 when the user initiates the log-in or other authentication procedure and proceeds to block 712 where the user enters a username and password and the predefined authentication information constituting the shared secret in the sequence specified by the shared secret. At decision block 714 the authentication mechanism determines if both the username and password are correct. If, for instance, the username is correct but the password is incorrect (block 716), the process proceeds to block 718 where the authentication mechanism determines if the incorrect password is an expired password that was at one time valid. If so, then the process proceeds to block 770 where the access to the resource is blocked or the user's account is suspended. This comparison against previous passwords prevents an attacker from discovering a user's old password from a phishing attack that may be closely related to their current password. If the attacker obtains the user's old password "Asdfjkl#1" then guesses "Asdfjkl#2" and then guesses "Asdfjkl#3" they will have unknowingly been able to correctly navigate a state machine expecting two invalid password attempts followed by a $3^{rd}$ correct password input. The system can be setup to prevent such somewhat random but socially engineered attacks against what might become commonly used state machine pattern easily remembered by users. The system might allow the malicious user to randomly keep trying username passwords after making the determination to move to block 770 so that the system does not prematurely reveal that the attacker did in fact enter previously valid passwords. The subsequent access attempts will keep the attacker busy while intrusion detection, end user notification and appropriate tracing of the source of the attack are identified and potentially blocked in future access attempts for other user's accounts.

If the username and password have been determined at block 716 not to have been correctly provided, or if at block 718 the username was found to be correct but the password was a previously valid password, the process proceeds to block 750, which is discussed below.

If, on the other hand, at decision block 714 the username and password that are entered by the user are correct, then the process proceeds to block 720. At block 720 the authentication mechanism then determines if the predefined authentication information constituting the shared secret has been correctly entered at block 712 in the sequence predefined in the shared secret. If so, then access is granted to the requested resource at block 740 and the process ends. If the predefined authentication information has not been correctly provided, the method may proceed to optional block 750, where, similar to block 650 in FIG. 6, the authentication mechanism may determine the number of incorrect authentication attempts the user is allowed before either blocking access to the resource or suspending the account, based on the complexity of the password or other credentials. As an alternative to this optional step, the authentication mechanism may simply provide the user with a default number of attempts to successfully complete the authentication process before blocking access to the resource or suspending the account. The state machine can be configured to only allow invalid password attempts in this scenario that have never been used before because it is conceivable that a malicious attacker could gain access to the user's old password, which should not be considered a valid state machine transition.

Using either a default number of attempts to successfully complete the authentication process or the number determined at block 750 or a risk calculation as mentioned above, the authentication mechanism will determine if that number has been exceeded at decision block 760. If so, the process proceeds to block 770, where the authentication mechanism may either block access to the resource for some period of time (e.g., 10 minutes) before the user may be allowed to make another attempt or, alternatively, the user's account may be suspended, requiring the user to take additional steps to have it reinstated. If the number of attempts to gain access has not been exceeded, the process returns to block 712, which allows the user to once again attempt to gain access to the resource.

The creation of the state machine steps that will be performed by a user when attempting to access the computing resources can be implemented in virtually an unlimited number of ways. Several examples will be given below, however they are not intended to limit the scope of the subject matter described herein, but rather are to serve as examples for someone trying to come up with a method of creating and sharing the state machine steps with their users. First, a client machine can present a user a user interface with a list of choices by opening a command prompt and running an application such as:
C:\create_usr_state_machine.exe
The client computer may then provide a text based user interface giving the user 10 choices in the example below plus an $11^{th}$ learning mode. The user will build a state machine by entering the number representing each state they want to select in the order the user wants to perform it, which builds a shared secret between the user and the local machine. The user state machine executable then prompts the user with this kind of interface:

Choose one or more states to customize your access state machine:
Choice 1: Enter the password wrong
Choice 2: Enter the password correctly
Choice 4: Disable WiFi
Choice 5: Enable WiFi
Choice 6: Connect to current WiFi access point name
Choice 7: Press Num Lock Key
Choice 8: Press Ctrl Key
Choice 9: Move mouse to the right
Choice 10: Move mouse to the left
Choice 11: Learning Mode
Please select your first state:
(The user then types a number choice between 1 and 10 and presses enter.)
"Please select your first state:"<assume the user enters 1>+<enter key>
"Please select your second state:"<assume the user enters 1>+<enter key>
"Please select your third state:"<assume the user selects 6>+<enter key>
"Please select your fourth state:"<assume the user selects 9>+<enter key>
"Please select your fifth state:"<assume the user selects 2>+<enter key>
"Please select your sixth state:"<assume the user presses enter key with nothing selected>

The local machine stores the state machine on the computer and the authentication module 312 will compare the inputs presented by the user and the environment against this user's future access attempts to determine if they successfully followed the state machine before granting access to the resources. For the user to complete the aforementioned configured state machine, the user will enter a password wrong two times, then connect to WiFi SSID, then move the mouse to the right, then enter the password correctly to get access. The user could also have other access state machine or other passwords associated with this same user account. The user might be given a choice to name the state machine to assist them in remembering differently configured state machines they want to perform or delete.

Another example of how a user may create the steps performed by the state machine to enhance their username and password or other authentication credential (such as a fingerprint or PIN) is by using a helper application that records the state machine steps as they perform a valid log in, without the tool recording their secret credentials like username and password that are likely to change over time. An example of an existing application that makes it easy for a user to record their user interface interactions is called the "Steps Recorder" application found on the Microsoft Windows 10 operating system at the default install path of CAWindows\System32\psr.exe, which may be located by searching for the "Steps Recorder" application. This application does not currently support creating an access state machine but serves as an example of how an application can record user interactions without recording their secret credentials and save the interactions in a file. The user can be provided with the option to create an authentication state machine when the account is created, the password modified, or at any other time from a user account administration user interface page. The user can invoke the application to record their access state machine, log out from the computer, and then, during the log in attempt, perform the state machine actions that they will repeat each time they log into the computer using the desired state machine. When the user accesses the computer using valid credentials, they can stop the recording and save the state machine under a specific name or use it as the default access state machine. The user can also edit the recorded state machine to configure the parameters to be live values like a greater than a 10 second delay instead of a 8.5 second delay recorded by the utility.

The user may now configure a user access state machine that will require them to e.g., enter their password wrong two times and be connected to the current WiFi access point name and before they hit enter on their password for the third access attempt, they move their mouse to the right. If and only if they perform all these states in the correct order will their username and password credentials pass the authentication check and grant them access to the computer. This might be useful when a user is at home and wants a user account with a short password that leverages the fact they have already entered a log password to join their WiFi network. If the WiFi was unprotected by a password then the user might not be able to select it as a choice for the state machine depending on the security policy settings of the client machine.

The sample application mentioned above included choice 11 that could place the client computer in a learning mode that records a few keystrokes or inputs from the user such as the user enabling and disabling the WiFi, measuring the frequency of taps by the user, audio spoken by the user such as a pass phrase to be spoken during an access attempt. After the user performs the desired number of events, they can press enter to stop the recording of events. The system may ask the user to perform the steps two or more times in order to ensure both the system and the user have a mutual understanding of the shared secret and eliminate spurious inputs. The user can review the list of states recorded by the application and edit them removing something that the user finds no longer desirable or to modify a state. The user for example could edit a state machine input state expecting a voice print state for a keyword "Mar. 13, 2017" and instead substituting a spoken word with a meta phrase such as "today's date." Meaning the user will say today's date when they attempt an access instead of the system looking for a pass phrase with a voice print identical to the user. The system would be listening during access requests for a user speech input that can be converted to text with the result being today's date to match one of the state inputs that is required to access the system.

The sample application has been described as a local client application, however it could be executed in a browser and part of an enhanced secure access feature offered by a web site for example. The state machine inputs would be offered to a user to configure, or the user could create them in a learning mode as option 11 in the sample application explained. Either way the remote site and user now have created a shared secret to be used to provide extra protection for their account and assist future detection of malicious activity related to their account(s).

The configuration of the state machine could result in a module that has the states hard coded in the state machine and would require an attacker to decompile it to understand the code with incomplete information that is maintained by the remote server separate from the access state machine config data related module, making it more difficult to reverse engineer the steps required. Alternatively, the states could be a set of configuration options without executable code that are possibly encrypted and stored on the local machine, a trusted platform module (TPM), or a remote server. The user or browser might retrieve the remote access data or module associated with the user name only after entering the username and password correctly to unlock an opportunity to try and perform the state machine. The client machine could send superfluous amounts of data mixed in with the expected state values which is a shared secret with the remote server that can pick out the specific values or attributes of the user that is attempting to access to remote site. If the client retrieves the module or data and fails to perform the required state machine steps, the remote server could delete the access state machine configuration from the acceptable list of states. The remote site might provide the user with a list of state machine access that are supported along with some decoy names to assist the user to remember which state machines they configured to access the remote site.

Figure 8:
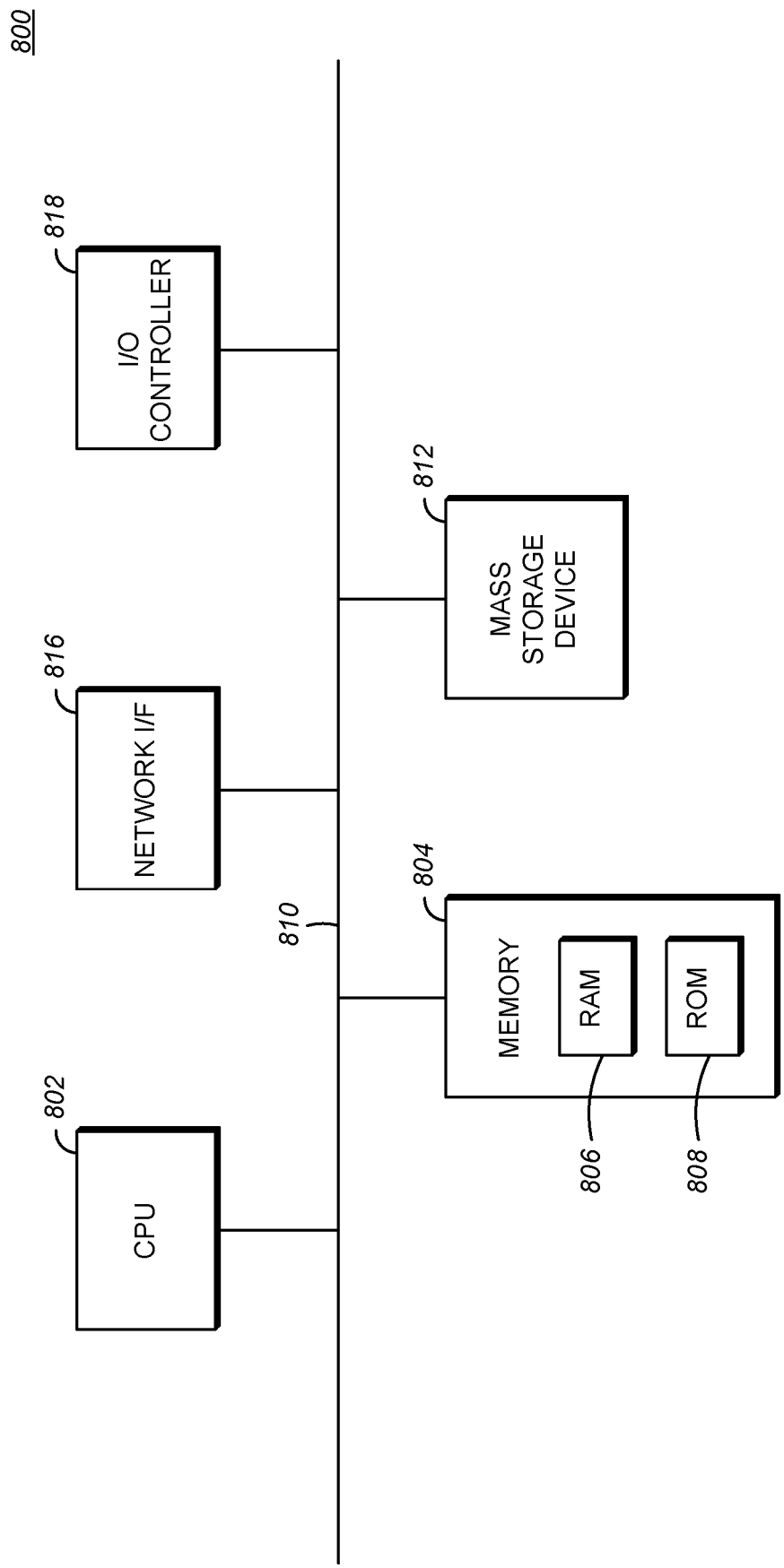
FIG. 8 shows an example architecture for a device such as the computing devices or network resource shown in FIG. 1.

FIG. 8 shows an example architecture 800 for a device such as the computing devices or network resource shown in FIG. 1 which are capable of executing the various components described herein for implementing aspects of the access control mechanisms described herein. Thus, the architecture 800 illustrated in FIG. 8 shows an architecture that may be adapted for a server computer, mobile phone, a PDA, a smartphone, a desktop computer, a netbook computer, a tablet computer, GPS device, gaming console, and/or a laptop computer, for example. The architecture 800 may be utilized to execute any aspect of the components presented herein.

The architecture 800 illustrated in FIG. 8 includes a CPU (Central Processing Unit) 802, a system memory 804, including a RAM 806 and a ROM 808, and a system bus 810 that couples the memory 804 to the CPU 802. A basic input/output system containing the basic routines that help to transfer information between elements within the architecture 800, such as during startup, is stored in the ROM 808. The architecture 800 further includes a mass storage device 812 for storing software code or other computer-executed code that is utilized to implement applications, the file system, and the operating system.

The mass storage device 812 is connected to the CPU 802 through a mass storage controller (not shown) connected to the bus 810. The mass storage device 812 and its associated computer-readable storage media provide non-volatile storage for the architecture 800.

Although the description of computer-readable storage media contained herein refers to a mass storage device, such as a hard disk or CD-ROM drive, it should be appreciated by those skilled in the art that computer-readable storage media can be any available storage media that can be accessed by the architecture 800.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 800.

According to various embodiments, the architecture 800 may operate in a networked environment using logical connections to remote computers through a network. The architecture 800 may connect to the network through a network interface unit 816 connected to the bus 810. It should be appreciated that the network interface unit 816 also may be utilized to connect to other types of networks and remote computer systems. The architecture 800 also may include an input/output controller 818 for receiving and processing input from a number of other devices, including a keyboard, mouse, or electronic stylus (not shown in FIG. 8). Similarly, the input/output controller 818 may provide output to a display screen, a printer, or other type of output device (also not shown in FIG. 8).

It should be appreciated that the software components described herein may, when loaded into the CPU 802 and executed, transform the CPU 802 and the overall architecture 800 from a general-purpose computing system into a special-purpose computing system customized to facilitate the functionality presented herein. The CPU 802 may be constructed from any number of transistors or other discrete circuit elements, which may individually or collectively assume any number of states. More specifically, the CPU 802 may operate as a finite-state machine, in response to executable instructions contained within the software modules disclosed herein. These computer-executable instructions may transform the CPU 802 by specifying how the CPU 802 transitions between states, thereby transforming the transistors or other discrete hardware elements constituting the CPU 802.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the architecture 800 in order to store and execute the software components presented herein. It also should be appreciated that the architecture 800 may include other types of computing devices, including handheld computers, embedded computer systems, smartphones, PDAs, and other types of computing devices known to those skilled in the art. It is also contemplated that the architecture 800 may not include all of the components shown in FIG. 8, may include other components that are not explicitly shown in FIG. 8, or may utilize an architecture completely different from that shown in FIG. 8.

Figure 9:
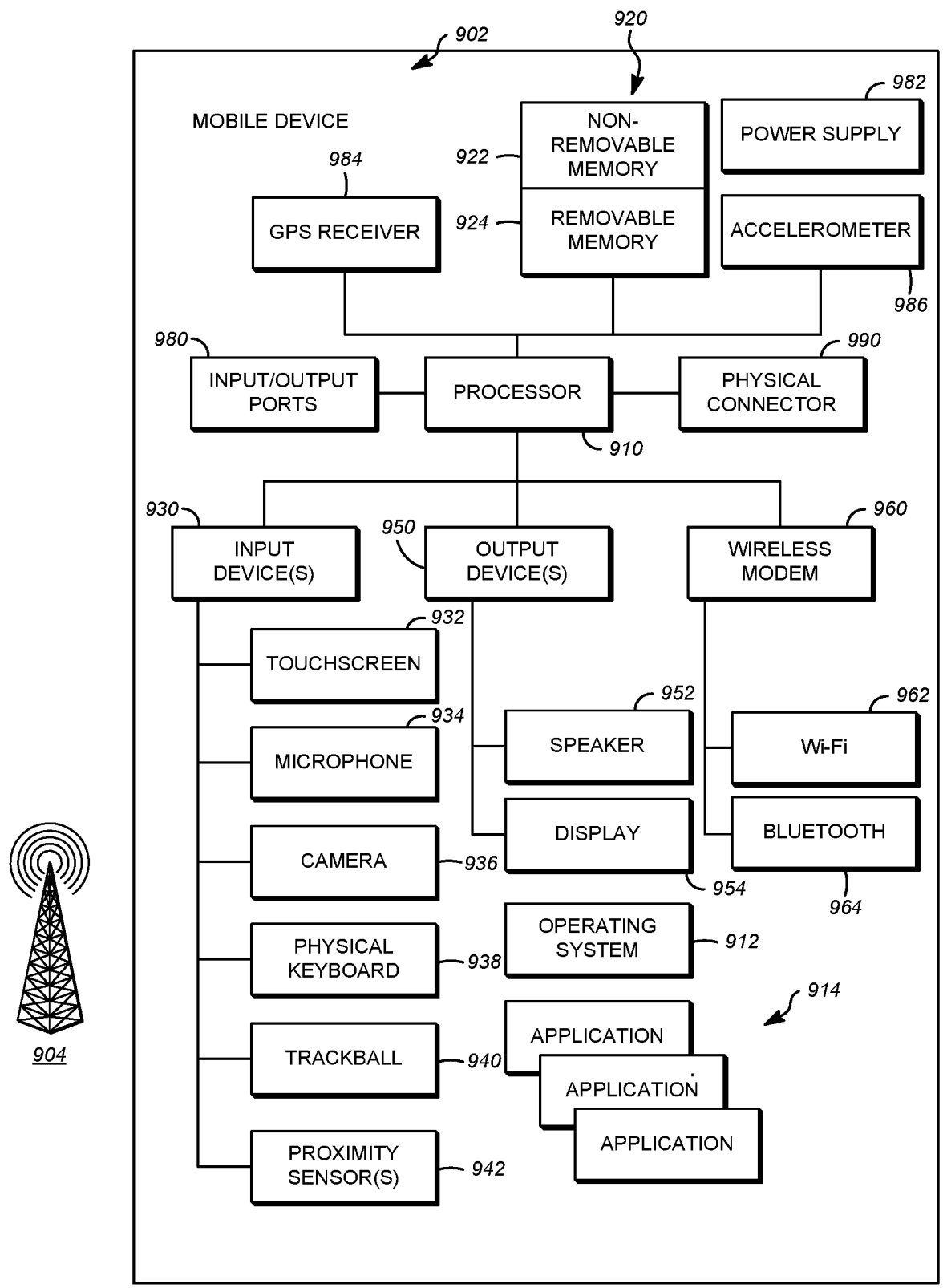
FIG. 9 is a more detailed functional block diagram of another illustrative computing device such as a mobile phone or smartphone.

FIG. 9 is a functional block diagram of another illustrative computing device 902 such as a mobile phone or smartphone including a variety of optional hardware and software components. Any component in the computing device 902 can communicate with any other component, although, for ease of illustration, not all connections are shown. The computing device can be any of a variety of computing devices (e.g., cell phone, smartphone, tablet computer, handheld computer, wearable computing device, HMD device, PDA, and the like) and can allow wireless two-way communications with one or more mobile communication networks 904, such as a cellular or satellite network.

The computing device 902 can include a controller or processor 910 (e.g., signal processor, microprocessor, microcontroller, ASIC (Application Specific Integrated Circuit), or other control and processing logic circuitry) for performing such tasks as signal coding, data processing, input/output processing, power control, and/or other functions. An operating system 912 can control the allocation and usage of the components 902, including power states, above-lock states, and below-lock states, and provides support for one or more application programs 914. The application programs can include common mobile computing applications (e.g., image-capture applications, email applications, calendars, contact managers, web browsers, messaging applications), or any other computing application.

The computing device 902 can include memory 920. Memory 920 can include non-removable memory 922 and/or removable memory 924. The non-removable memory 922 can include RAM, ROM, Flash memory, a hard disk, or other well-known memory storage technologies. The removable memory 924 can include Flash memory or a Subscriber Identity Module (SIM) card, which is well known in GSM (Global System for Mobile communications) systems, or other well-known memory storage technologies, such as "smart cards." The memory 920 can be used for storing data and/or code for running the operating system 912 and the application programs 914. Example data can include web pages, text, images, sound files, video data, or other data sets to be sent to and/or received from one or more network servers or other devices via one or more wired or wireless networks.

The memory 920 may also be arranged as, or include, one or more computer-readable storage media implemented in any method or technology for storage of information such as computer-readable instructions, data structures, program modules or other data. For example, computer-readable media includes, but is not limited to, RAM, ROM, EPROM, EEPROM, Flash memory or other solid state memory technology, CD-ROM (compact-disc ROM), DVD, (Digital Versatile Disc) HD-DVD (High Definition DVD), Blu-ray or other optical storage, magnetic cassettes, magnetic tape, magnetic disk storage or other magnetic storage devices, or any other medium which can be used to store the desired information and which can be accessed by the device 902.

The memory 920 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment. The device 902 can support one or more input devices 930, such as a touchscreen 932; microphone 934 for implementation of voice input for voice recognition, voice commands and the like; camera 936; physical keyboard 938; trackball 940; and/or proximity sensor 942; and one or more output devices 950, such as a speaker 952 and one or more displays 954. Other input devices (not shown) using gesture recognition may also be utilized in some cases. Other possible output devices (not shown) can include piezoelectric or haptic output devices. Some devices can serve more than one input/output function. For example, touchscreen 932 and display 954 can be combined into a single input/output device.

A wireless modem 960 can be coupled to an antenna (not shown) and can support two-way communications between the processor 910 and external devices, as is well understood in the art. The modem 960 is shown generically and can include a cellular modem for communicating with the mobile communication network 904 and/or other radio-based modems (e.g., Bluetooth 964 or Wi-Fi 962). The wireless modem 960 is typically configured for communication with one or more cellular networks, such as a GSM network for data and voice communications within a single cellular network, between cellular networks, or between the device and a public switched telephone network (PSTN).

The device can further include at least one input/output port 980, a power supply 982, a satellite navigation system receiver 984, such as a GPS receiver, an accelerometer 986, a gyroscope (not shown), and/or a physical connector 990, which can be a USB port, IEEE 1394 (FireWire) port, and/or an RS-232 port. The illustrated components 902 are not required or all-inclusive, as any components can be deleted and other components can be added.

Various exemplary embodiments of the present access control mechanism are now presented by way of illustration and not as an exhaustive list of all embodiments. An example includes a method for providing access control to a resource, comprising: receiving, by one or more processors, an authentication request from a user to access a resource that is protected by a shared secret established between the user and an authentication mechanism that controls access to the resource, the shared secret including a predefined sequence of states during each of which predefined authentication information is to be provided; receiving, by the one or more processors, user-specified information for each of the states (or system detectable information like user input gestures or screen taps or clicks, peripheral device types present, WiFi SSID connection, etc); verifying if the user-specified information (or system detectable information or events) matches the predefined authentication information and has been correctly entered during each state and in the predefined sequence; and granting access to the resource if the predefined authentication information has been correctly entered during each state and in the predefined sequence.

In another example, the method further includes receiving one or more additional user credentials to gain access to the resource and only granting access to the resource if the additional user credentials are verified as being correct. In another example, the resource is a network-based resource and the authentication request is received by a server associated with the network-based resource over a communication network. In another example, the authentication request is received through a user interface of a computing device in which the processor is located and the resource is locally available to the computing device. In another example, at least one of the states in the predefined sequence of states requires one of the user credentials to be incorrectly entered by the user. In another example, the method further includes presenting the user with a series of user-selectable states that include at least one state that does not allow access to the resource to be granted and at least one other state that does allow access to the resource to be granted, and wherein granting access to the resource further includes only granting access to the resource if the user selects the at least one other state and not the at least one state. In another example, the method further includes presenting the user with a series of user-selectable states that include a plurality of user-selectable states that each prompt the user for a response, wherein only one of the plurality of user-selectable states are included in the shared secret such that if the user selects any remaining ones of the plurality of user-selectable states access to the resource will be denied. In another example, granting access to the resource includes granting access to the resource only if the user correctly responds to the prompt provided during the one user-selectable state that is included in the shared secret. In another example, the network resource is associated with a web site that receives the authentication request and wherein at least one state in the predefined sequence of states requires the user to access the web site through a predetermined alternative web site or specific URL in order for access to the resource to be granted. In another example, the method further includes, when one of the additional credentials is provided incorrectly such that access to the resource is denied, allowing the user to re-submit the user-specified information for each of the states a specified number of times, the specified number of times being based at least in part on a complexity of the one additional credential. In another example, the method further includes, when one of the additional credentials that is provided is a previously valid credential that is now expired, denying access to the resource.

A further example includes one or more computer-readable memory devices storing instructions which, when executed by one or more processors, perform a method for establishing a use account allowing access to one or more protected resources, comprising: establishing user credentials and a shared secret with an access control mechanism associated with the one or more protected resources, wherein establishing the shared secret includes specifying a sequence of states and information that is to be provided during each of the states, the user credentials and shared secret to be presented to the access control mechanism to gain access to the one or more protected resources; storing the one or more user credentials in a first data structure so that the user credentials are accessible to the access control mechanism upon receiving an authentication request from the user requesting access to the one or more protected resources; and storing the shared secret as executable code in second database (or storage location) so that the executable code is accessible to the access control mechanism upon receiving an authentication request from the user requesting access to the one or more protected resources.

In another example, the one or more computer-readable memory devices further includes a common data structure that includes the first and second data structures. In another example, the one or more computer-readable memory devices further include associating with the user credentials stored in the first database a reference indicative to the access control mechanism of a location from which the shared secret executable code is accessible. In another example, establishing the shared secret further includes establishing a shared secret that causes a user accessing the user account to be presented with a series of user-selectable states that include at least one state that does not allow access to the one or more protected resources to be granted and at least one other state that does allow access to the one or more protected resources to be granted such that access to the one or more protected resources is only granted if the user selects the one other state and not the at least one state. In another example, establishing the shared secret further comprises establishing a shared secret that causes a user accessing the user account to be presented with a plurality of user-selectable states that each prompt the user for a response, wherein selection of only one of the plurality of user-selectable states allows access to the one or more protected resources and selection of any remaining ones of the plurality of user-selectable states denies access to the one or more protected resources.

A further example includes a computing device, comprising: one or more processors; a user interface (UI) configured to interact with a user of the device; a memory device storing computer-readable instructions which, when executed by the one or more processors, perform a method to: execute a state machine; receive a request via the user interface to access a protected resource; responsive to the request to access the protected resource, prompt the user through the user interface to provide predefined authentication information needed to access the protected resource, the prompt prompting the user to cause user-specified authentication information to be received by the state machine during each of a predefined sequence of states of the state machine; use the state machine to verify if the user-specified information matches the predefined authentication information and has been correctly entered during each state and in the predefined sequence; and grant access to the protected resource if the predefined authentication information has been correctly entered during each state and in the predefined sequence. The user interface (UI) may not give any indication to the user that a state machine is being performed. One of the advantages of the enhanced security and intrusion detection is keeping attackers unaware of the existence of the shared secret between the system and the user. The user benefits when a malicious attacker might only see a username and password input field with a submit button, while the attacker can input a valid username and password, missing the shared secret step before hand can be used to signal an intrusion to the client or backend account management systems that result in preventing the malicious attacker from successfully accessing the protected resources or even granting them access to fake honeypot resources.

In another example, the method performed by the device further includes receiving one or more additional user credentials to gain access to the resource and only granting access to the resource if the additional user credentials are verified as being correct. In another example, at least one state in the predefined sequence of states requires one of the additional user credentials to be incorrectly entered by the user. In another example, when one of the additional credentials is provided incorrectly such that access to the resource is denied, the method further includes allowing the user to re-submit the user-specified information for each of the states a specified number of times, the specified number of times being based at least in part on the complexity of the one additional credential.

In another example the subject matter described herein may be a flexible and extensible solution that can be adapted for incorporation into existing computer authentication protocols such as Kerberos and Microsoft Managed Service Accounts (MSA), for example, as would be understood by those skilled in the art. The subject matter described herein can be adapted to be suitable to any general class of authentication systems that rely on credentials or tokens such as personal identification numbers (PIN) or user password so that these systems can be extended to incorporate a shared secret state machine at a session layer where the system advances during access retries or even a system level that keeps track of one time access attempts for an account that follows a shared secret pattern (e.g, the user tries to log in with invalid never used before password credentials, waits more than 15 seconds but less than 20 seconds, and tries again with valid password and would be granted access).

Based on the foregoing, it should be appreciated that technologies for controlling access to protected resources have been disclosed herein. Although the subject matter presented herein has been described in language specific to computer structural features, methodological and transformative acts, specific computing machinery, and computer-readable storage media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

The invention claimed is:

1. A computer-implemented method for providing access control to a resource, comprising:
    receiving an authentication request to access a resource using a shared secret between a requesting device and an authentication mechanism, the shared secret including predefined authentication information states arranged in a predefined sequence;
    receiving specified information items in a specified sequence such that each of the specified information items corresponds to one of the predefined authentication information states;
    accessing the predefined authentication information states arranged in a predefined sequence;
    determining whether each of the specified information items correctly match its corresponding predefined authentication information state;
    in response to a determination that a match is incorrect such that access to the resource is denied, allowing re-submission of the specified information items up to and including a determined number of times that is based upon a complexity of the predefined authentication information states.

2. The computer-implemented method of claim 1 further comprising receiving one or more additional credentials to gain access to the resource and only granting access to the resource if the additional credentials are verified as being correct.

3. The computer-implemented method of claim 1 in which the resource is a network-based resource and the authentication request is received by a server associated with the network-based resource over a communication network.

4. The computer-implemented method of claim 1 in which the authentication request is received through a user interface of a computing device in which a processor performing the computer-implemented method is located and the resource is locally available to the computing device.

5. The computer-implemented method of claim 1 in which at least one of the predefined authentication information states specifies that one of the credentials is to be incorrectly entered.

6. The computer-implemented method of claim 1 further comprising presenting the requesting device a series of selectable states that include at least one state that does not allow access to the resource to be granted and at least one other state that does allow access to the resource to be granted, and wherein granting access to the resource further includes only granting access to the resource upon selection of said at least one other state and not said at least one state.

7. The computer-implemented method of claim 1 further comprising presenting a series of selectable states that include a plurality of selectable states that each provide a prompt for a response, wherein only one of the plurality of selectable states is included in the shared secret such that if any remaining ones of the plurality of selectable states access are selected access to the resource will be denied.

8. The computer-implemented method of claim 7 further comprising granting access to the resource only upon receiving a correct response to the prompt associated with the one selectable state that is included in the shared secret.

9. The computer-implemented method of claim 1 in which the network resource is associated with a web site that receives the authentication request and wherein at least one of the predefined authentication information states specifies that the requesting device is to access the web site through a predetermined alternative web site in order for access to the resource to be granted.

10. The computer-implemented method of claim 2 further comprising, when one of the additional credentials that is provided is a previously valid credential that is now expired, denying access to the resource.

11. The computer-implemented method of claim 1, wherein in response to a determination that each of the specified information items correctly matches its corresponding predefined authentication information state, granting access to the resource.

12. One or more computer-readable memory devices storing instructions for establishing an account allowing access to one or more protected resources, the instructions when executed by one or more processors disposed in a computing device causing the computing device to:
    establish credentials and a shared secret with an access control mechanism associated with the one or more protected resources, wherein establishing the shared secret includes establishing predefined authentication information states arranged in a predefined sequence, the credentials and the shared secret to be presented to the access control mechanism to gain access to the one or more protected resources; and
    store the credentials in a first data structure so that the credentials are accessible to the access control mechanism upon receiving an authentication attempt from a requesting device requesting access to the one or more protected resources, wherein a number of authentication attempts allowed is based at least in part upon a complexity of the predefined authentication information states.

13. The one or more computer-readable memory devices of claim 12 in which the instructions when executed by the one or more processors disposed in the computing device further causes the computing device to:

associate with the credentials stored in the first data structure a reference indicative to the access control mechanism of a location from which the shared secret is accessible, wherein the shared secret includes executable code used to perform one or more state machine steps and interact with the access control mechanism upon receiving an authentication request from the location from which the shared secret executable code is accessible requesting access to the one or more protected resources.

14. The one or more computer-readable memory devices of claim 13 further comprising a common data structure that includes the first data structure and a second data structure.

15. The one or more computer-readable memory devices of claim 12 in which establishing the shared secret further comprises establishing a shared secret that causes a requesting device accessing the account to be presented with a sequentially presented series of selectable states that include at least one state that does not allow access to the one or more protected resources to be granted and at least one other state that does allow access to the one or more protected resources to be granted such that access to the one or more protected resources is only granted if the requesting device selects said at least one other state and not said at least one state.

16. The one or more computer-readable memory devices of claim 12 in which establishing the shared secret further comprises establishing a shared secret that causes a requesting device accessing the account to be sequentially presented with a plurality of selectable states that each prompt the requesting device for a response, wherein selection of only one of the plurality of selectable states allows access to the one or more protected resource and selection of any remaining ones of the plurality of selectable states denies access to the one or more protected resources.

17. A computing device, comprising:
one or more processors;
a user interface (UI) configured to interact with a user of the device;
a memory device storing computer-readable instructions which, when executed by the one or more processors, cause the computing device to:
execute a state machine;
receive a request from the user interface to access a protected resource;
responsive to the request to access the protected resource, present a prompt through the user interface to provide predefined authentication information needed to access the protected resource, the prompting enabling user-specified authentication information to be received by the state machine during each of a predefined sequence of states of the state machine;
use the state machine to verify whether the user-specified authentication information matches the predefined authentication information and was correctly entered during each state and in the predefined sequence; and
receive one or more additional user credentials to gain access to the resource and only grant access to the resource if the additional user credentials are verified as being correct when one of the additional user credentials is provided incorrectly such that access to the resource is denied, allowing the user to re-submit the user-specified information for each of the states a specified number of times, the specified number of times being based at least in part on a complexity of the one additional credential.

18. The computing device of claim 17 in which at least one states in the predefined sequence of states specifies that one of the additional user credentials is to be incorrectly entered through the user interface.

19. The computing device of claim 17 in which in response to a verification that the predetermined authentication information was correctly entered during each state and in the predefined sequence, access to the resource is granted.

20. The computing device of claim 17 further comprising causing the computing device to present the user interface with a series of user-selectable states that include a plurality of user-selectable states that each provide a prompt for a response, wherein only one of the plurality of user-selectable states are included in a shared secret between the user and the state machine such that if the s any remaining ones of the plurality of user-selectable states are selected access to the resource will be denied.

\* \* \* \* \*